(12) United States Patent
Kotoulas et al.

(10) Patent No.: US 6,751,602 B2
(45) Date of Patent: Jun. 15, 2004

(54) NEURAL NET CONTROLLER FOR NOISE AND VIBRATION REDUCTION

(75) Inventors: Antonios N. Kotoulas, Denville, NJ (US); Charles Berezin, Trumbull, CT (US); Michael S. Torok, Hamden, CT (US); Peter F. Lorber, Coventry, CT (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 22 days.

(21) Appl. No.: 10/287,963

(22) Filed: Nov. 5, 2002

(65) Prior Publication Data

US 2004/0030664 A1 Feb. 12, 2004

Related U.S. Application Data

(62) Division of application No. 09/752,180, filed on Dec. 29, 2000, now Pat. No. 6,493,689.

(51) Int. Cl.[7] .............................................. G05B 13/02
(52) U.S. Cl. ........................ 706/23; 700/30; 700/48; 700/280
(58) Field of Search ............................ 706/23; 700/30, 700/48, 280

(56) References Cited

U.S. PATENT DOCUMENTS

| | | | | |
|---|---|---|---|---|
| 3,298,443 | A | 1/1967 | Burkam et al. | 170/159 |
| 3,887,296 | A | 6/1975 | Mills et al. | 416/145 |
| 4,677,676 | A | 6/1987 | Eriksson | 381/71 |
| 4,715,559 | A | 12/1987 | Fuller | 244/1 N |
| 4,808,863 | A | 2/1989 | Andersson | 310/51 |
| 5,148,402 | A | * 9/1992 | Magliozzi et al. | 700/280 |
| 5,150,855 | A | 9/1992 | Kaptein | 244/1 N |
| 5,217,349 | A | 6/1993 | Succi | 415/119 |
| 5,255,871 | A | 10/1993 | Ikeda | 244/17.13 |
| 5,310,137 | A | 5/1994 | Yoerkie, Jr. et al. | 244/17.27 |

(List continued on next page.)

FOREIGN PATENT DOCUMENTS

GB 0693748 A2 1/1996

OTHER PUBLICATIONS

Nuero–adaptive active control of noise, Tokhi, M.O.; Wood, R.; IEEE Colloquium On Active Sound and Vibration Control, Nov. 24, 1997, pp. 2/1–2/3.*

Active control of vibration using a neural network, Snyder, S.D.; Tanaka, N.; Neural Networks, IEEE Transactions on, vol.:6, Issue: 4, Jul. 1995, pp. 819–828.*

Application of frequency–domain neural networks to the active control harmonic vibrations in nonlinear structural systems, Sutton, T.J.; Elliott, S.J.; Neural networks for Signal Processing [1992] II., Proceedingt of the 1992 IEEE Workshop, pp: 474–483.*

Nonlinearity–tolerated active noise control using an artificial neural network, Tan, C.X.; Tachibana, H.; Applications of Signal Processingt to Audio and Acoustics, 1997, 1997 IEEE AS Workshop on, Oct. 19–22, 1997.*

(List continued on next page.)

*Primary Examiner*—Leo Picard
*Assistant Examiner*—Michael B. Holmes

(57) ABSTRACT

Two neural networks are used to control adaptively a vibration and noise-producing plant. The first neural network, the emulator, models the complex, nonlinear output of the plant with respect to certain controls and stimuli applied to the plant. The second neural network, the controller, calculates a control signal which affects the vibration and noise producing characteristics of the plant. By using the emulator model to calculate the nonlinear plant gradient, the controller matrix coefficients can be adapted by backpropagation of the plant gradient to produce a control signal which results in the minimum vibration and noise possible, given the current operating characteristics of the plant.

7 Claims, 12 Drawing Sheets

U.S. PATENT DOCUMENTS

| | | | |
|---|---|---|---|
| 5,313,407 A | * 5/1994 | Tiernan et al. | 700/280 |
| 5,314,308 A | 5/1994 | Reed, III | 416/91 |
| 5,319,608 A | 6/1994 | Katz | |
| 5,359,663 A | 10/1994 | Katz | |
| 5,365,490 A | 11/1994 | Katz | |
| 5,367,612 A | * 11/1994 | Bozich et al. | 706/23 |
| 5,386,689 A | 2/1995 | Bozich et al. | 60/39.33 |
| 5,409,183 A | 4/1995 | Gunsallus | 244/17.13 |
| 5,426,720 A | * 6/1995 | Bozich et al. | 706/23 |
| 5,427,102 A | 6/1995 | Shimode et al. | |
| 5,434,783 A | * 7/1995 | Pal et al. | 701/36 |
| 5,453,943 A | 9/1995 | Magliozzi | 364/574 |
| 5,458,182 A | 10/1995 | Aoki et al. | |
| 5,541,832 A | * 7/1996 | Nakajima et al. | 700/28 |
| 5,588,800 A | 12/1996 | Charles et al. | 416/24 |
| 5,590,205 A | 12/1996 | Popovich | 381/71 |
| 5,620,304 A | 4/1997 | Matsuka et al. | 416/87 |
| 5,639,215 A | 6/1997 | Yamakawa et al. | 416/23 |
| 5,711,651 A | 1/1998 | Charles et al. | 416/24 |
| 5,735,670 A | 4/1998 | Moffitt et al. | 416/87 |
| 5,930,136 A | * 7/1999 | Nakajima et al. | 700/48 |
| 6,137,886 A | 10/2000 | Shoureshi | |
| 6,236,908 B1 | 5/2001 | Cheng et al. | |
| 6,493,689 B2 | * 12/2002 | Kotoulas et al. | 706/23 |

OTHER PUBLICATIONS

Improved training of neural networks for the nonlinear active control sound and vibration, Bouchard, M.; Paillard, B.; Chon Tan Le Dinh.; Neural Networks, IEEE Traqnsactions on, vol.: 10, Issue: 2, Mar. 1999, pp. 391–401.*

R.R. Leitch et al., "Active Noise Control Systems," *IEEE Proceedings*, vol. 134, Pt. A, No. 6, Jun. 1987, pp. 525–546.

Stephen J. Elliott et al., "The Behavior of a Multiple Channel Active Control System," *IEEE Transactions on Signal Processing*, vol. 40, No. 5, May 1992, pp. 1041–1052.

*Active Sound & Vibration Control News*, vol. 4, No. 1, Jan. 1997, pp. 1–6.

L.J. Eriksson, "Active Sound and Vibration Control: A Technology in Transition," *Noise Control Eng.*, vol. 44, No. 1, Jan.–Feb. 1996. pp. 1–9.

L.J. Eriksson, "A Primer on Active Sound and Vibration Control," *Sensors*, Feb. 1997, pp. 18–31.

* cited by examiner

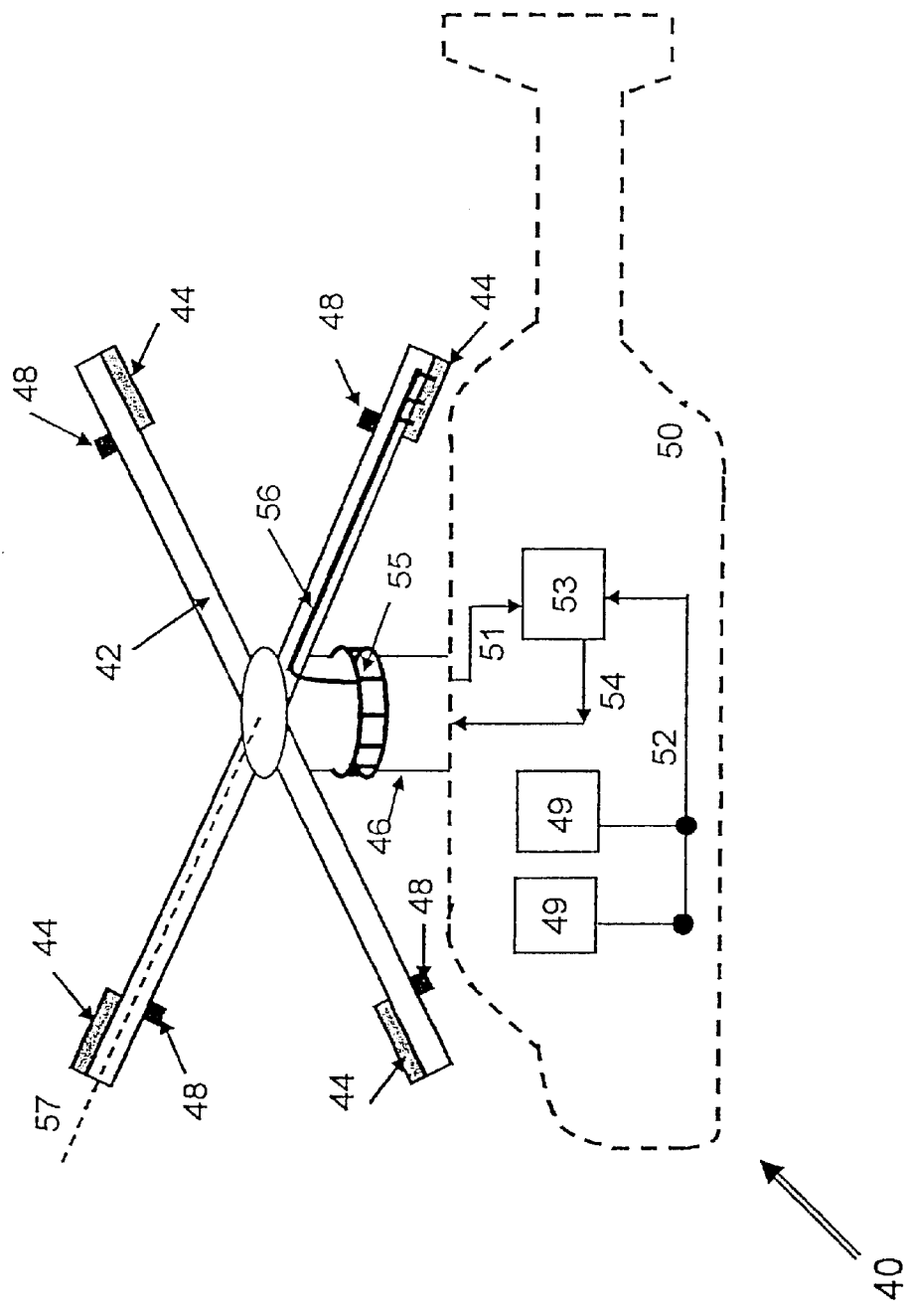
Figure 1 Active Control System for Helicopter Noise and Vibration Reduction

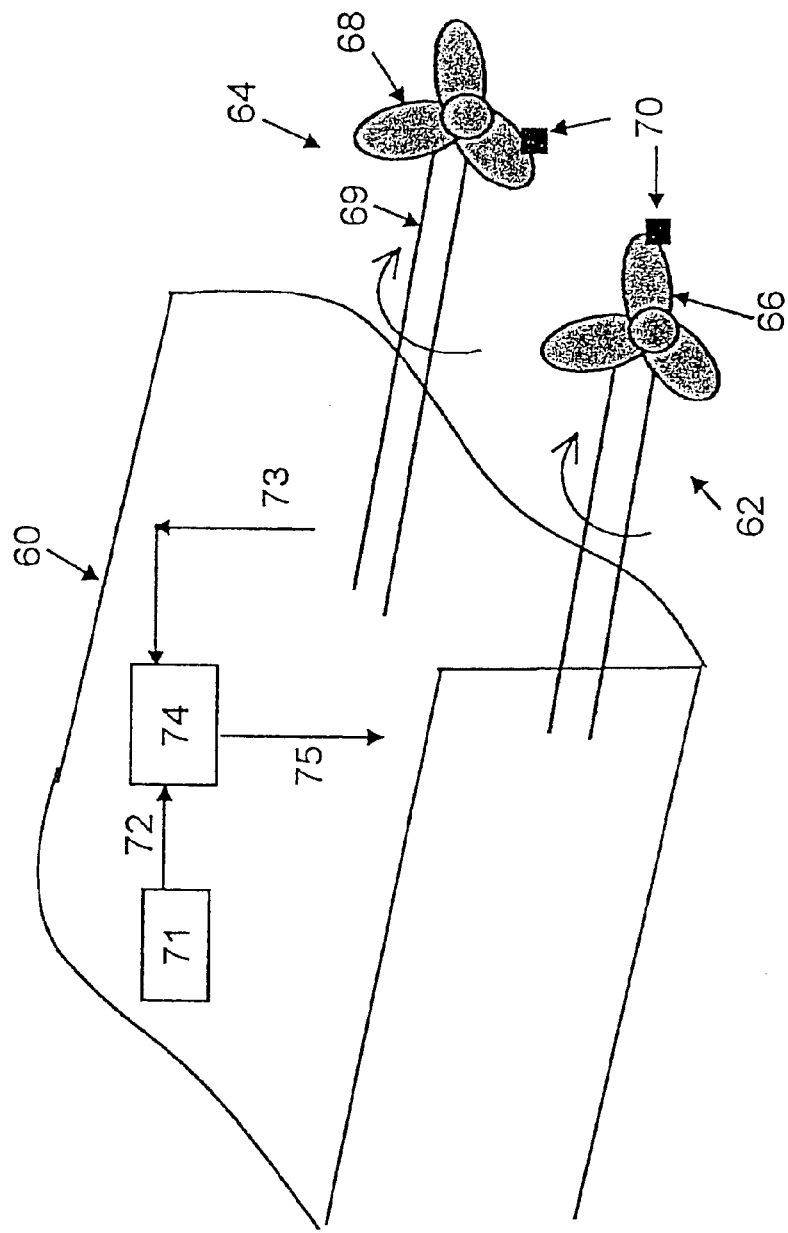
Figure 2 Active Control System for Ship Propeller Noise and Vibration Reduction

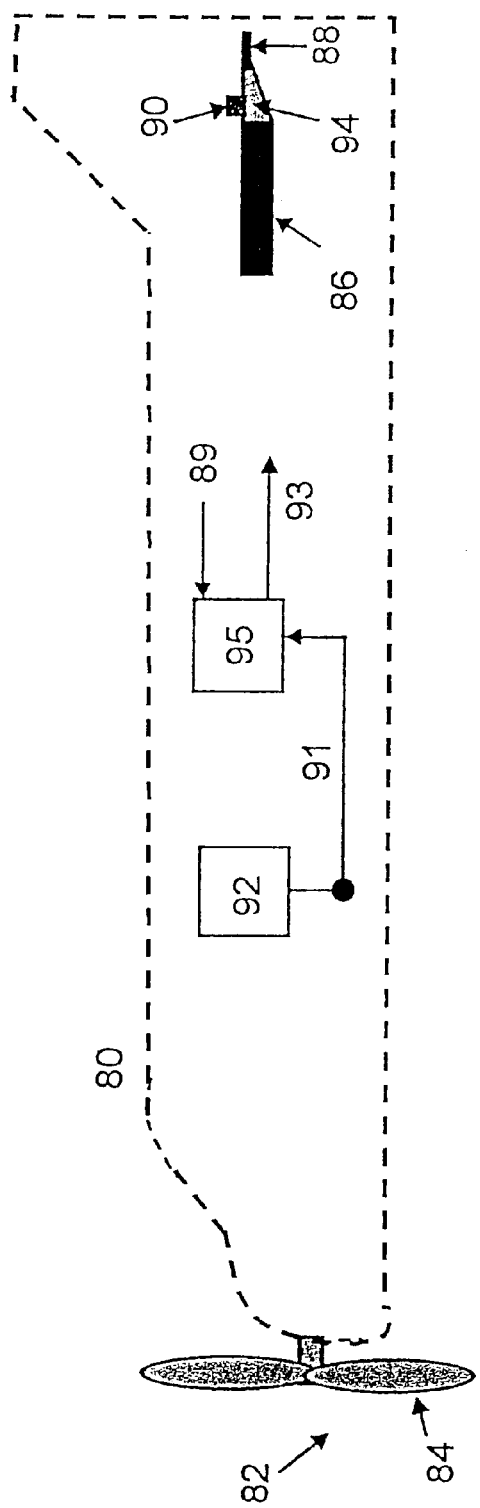
Figure 3 Active Control System for Airplane Propeller Noise and Vibration Reduction

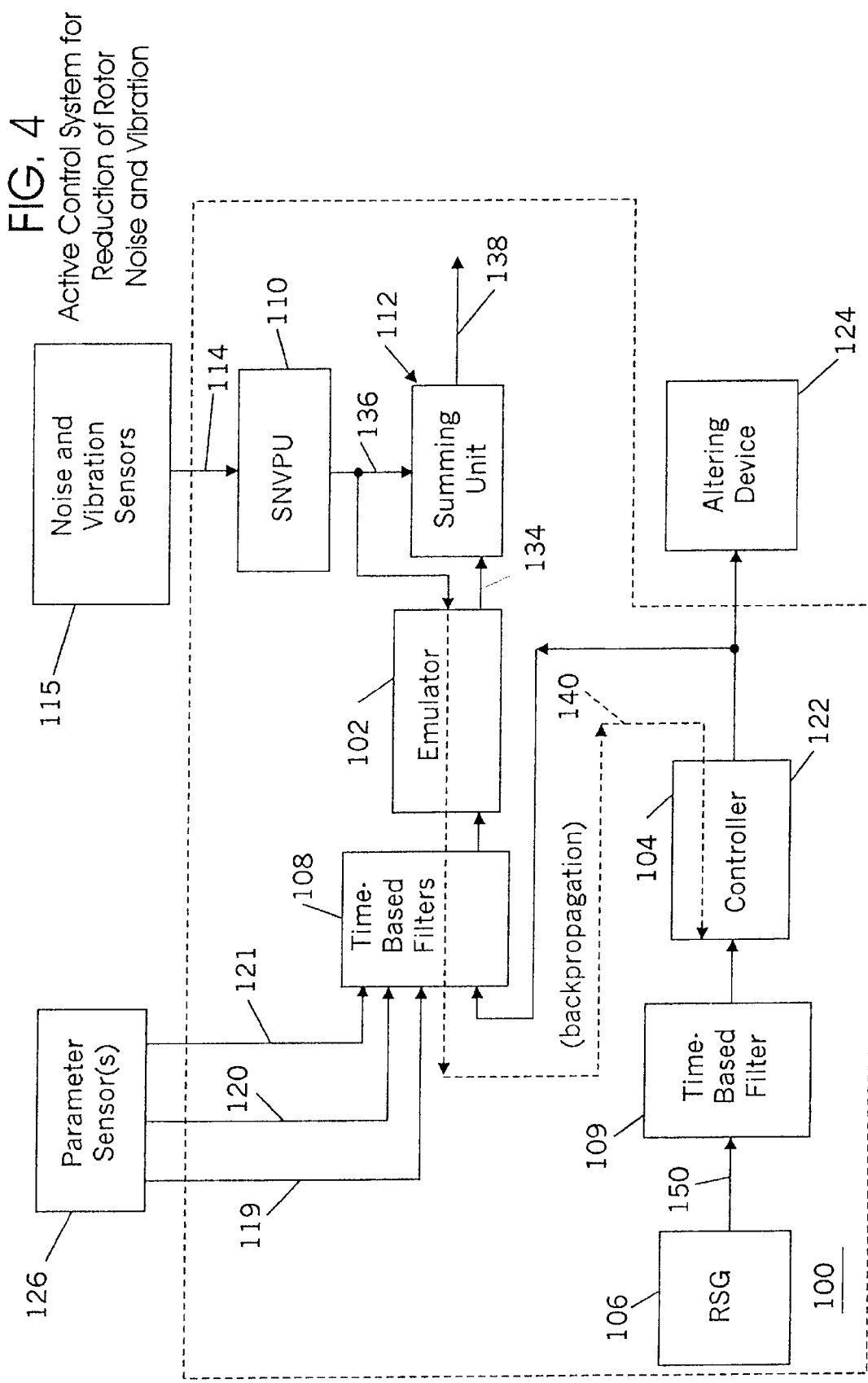

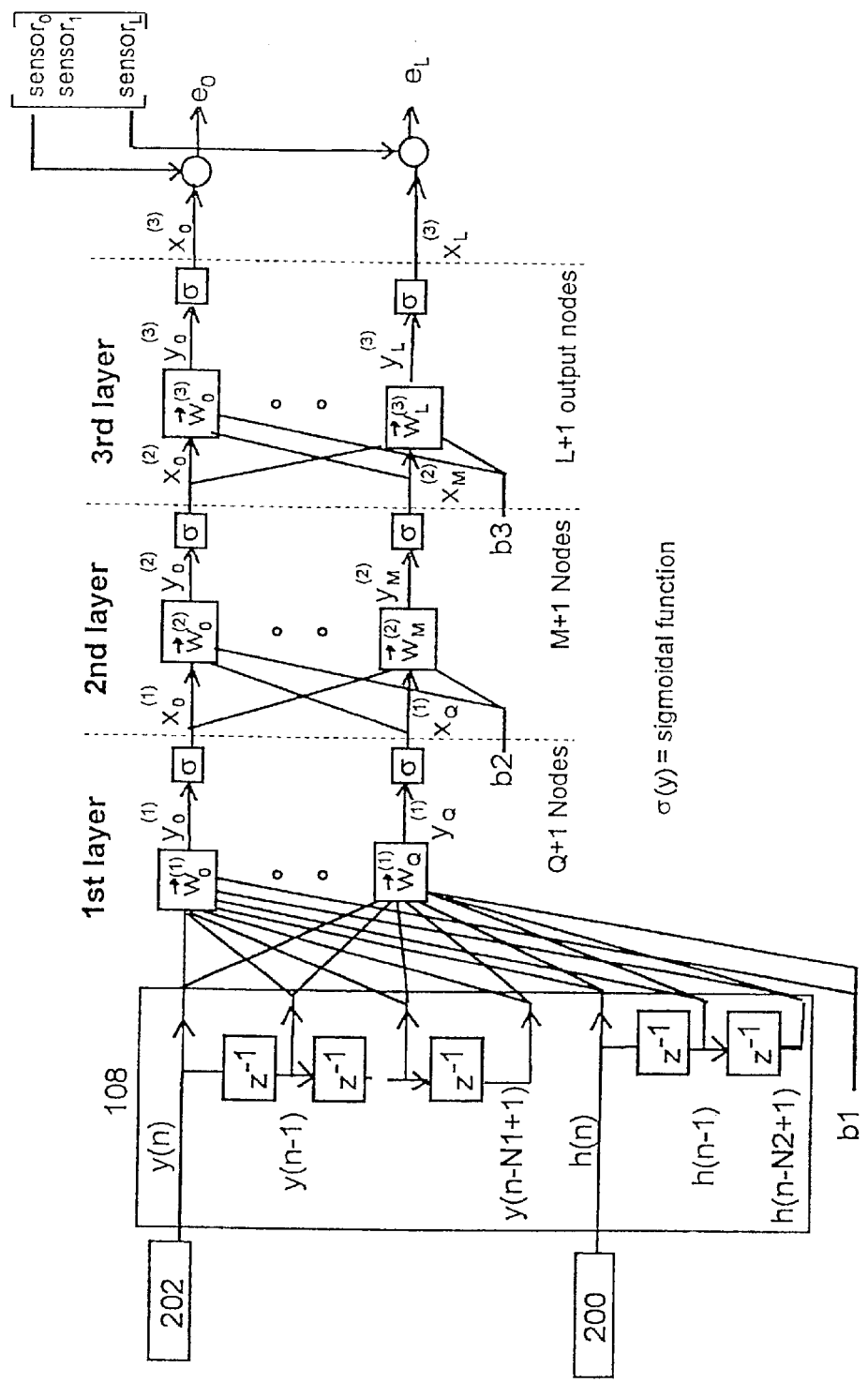
Figure 5 Neural Net Architecture

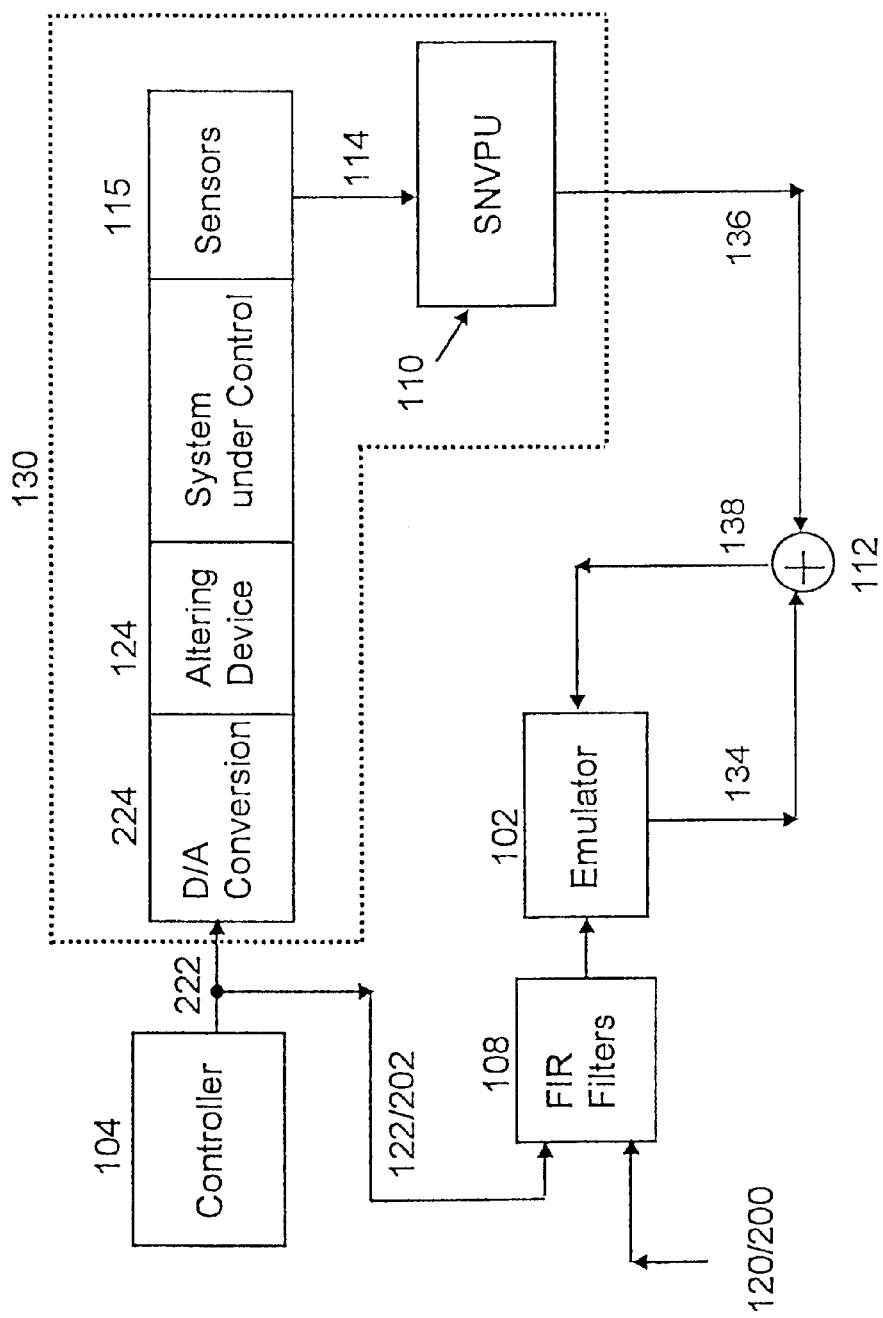
Figure 6 Emulator Training

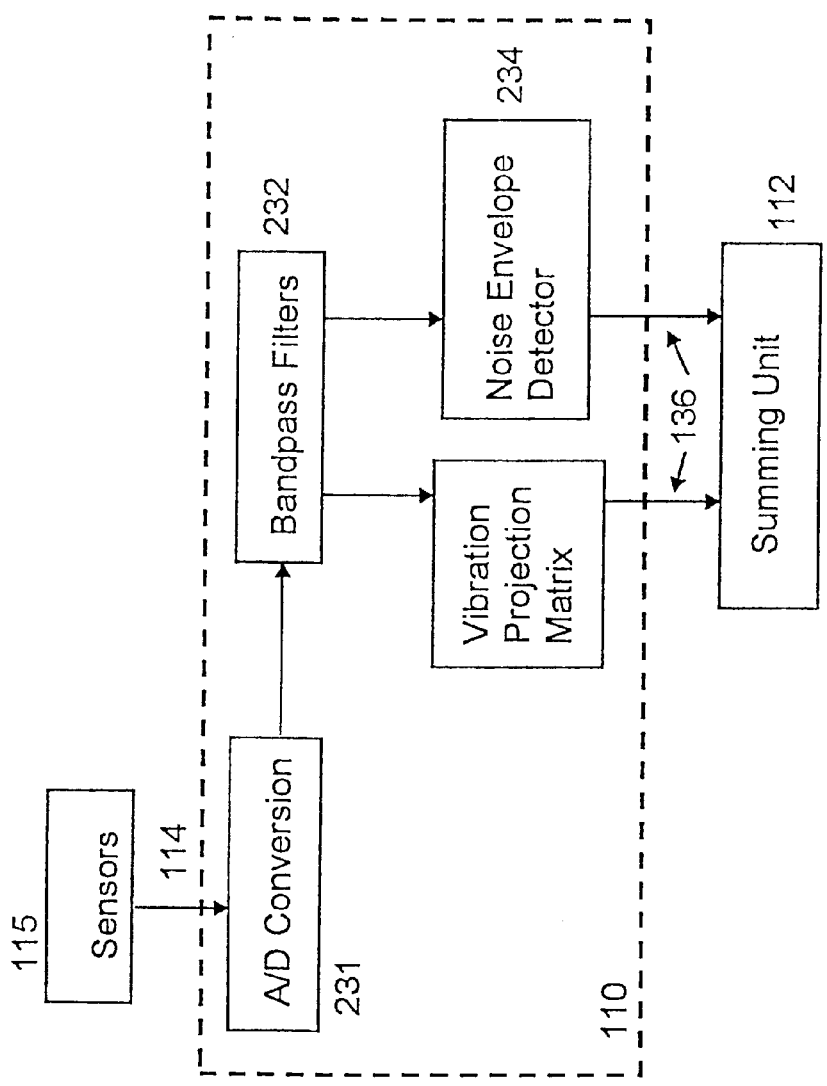
Figure 7 Sensed Noise and Vibration Preprocessing Unit (SNVPU)

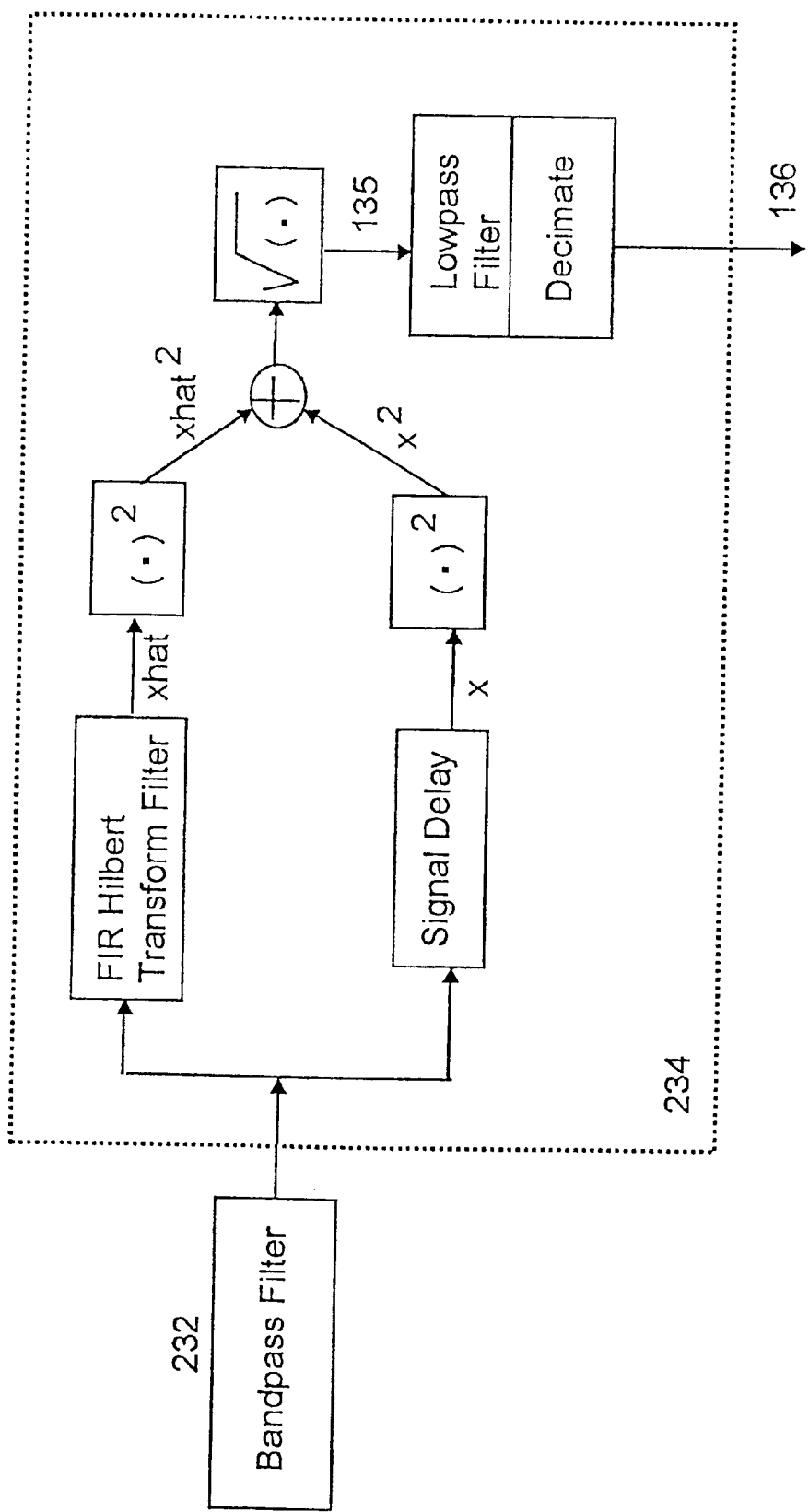
Figure 8 Noise Envelope Detector Using Hilbert Transform Filter

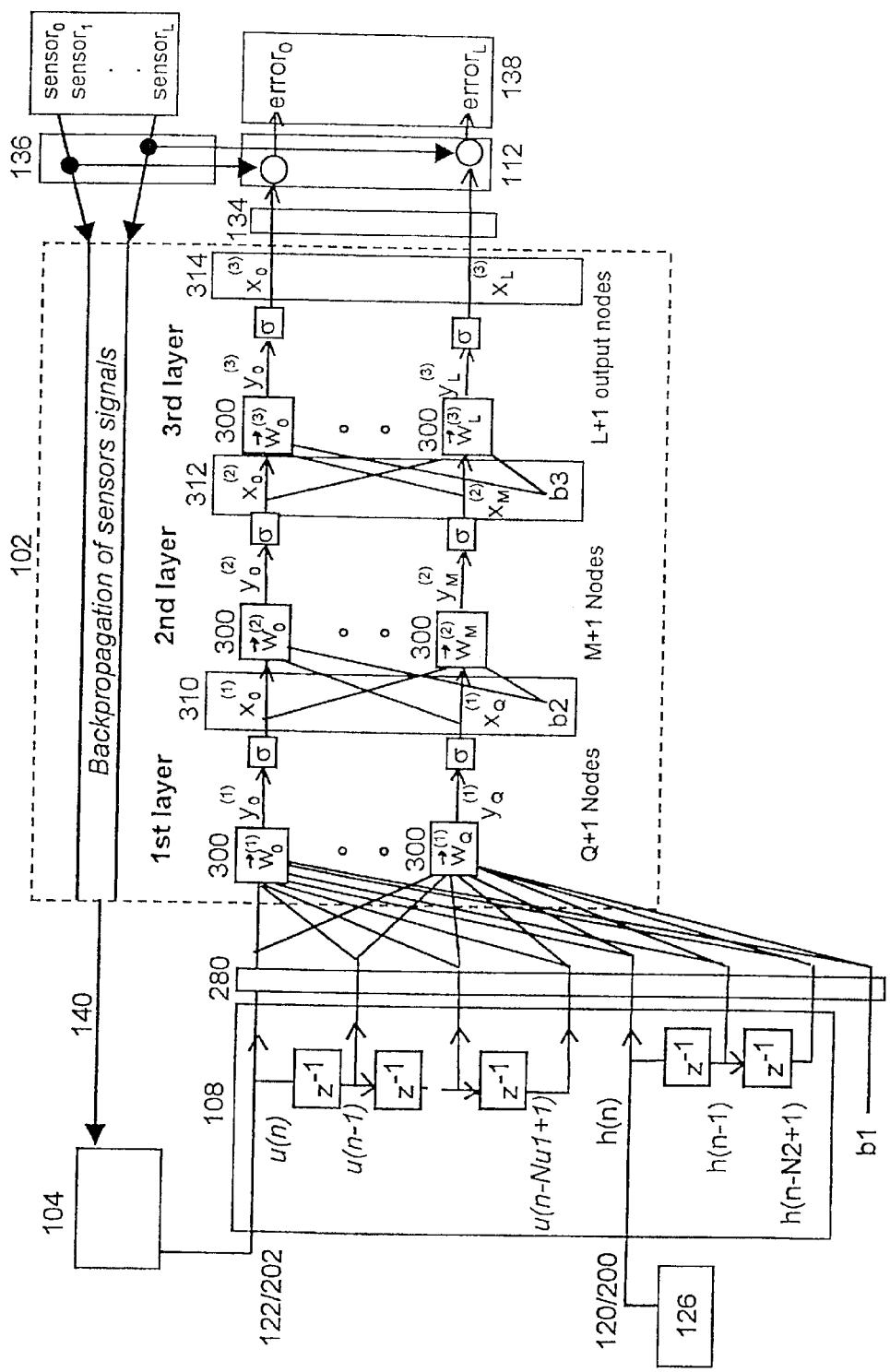
Figure 9 Emulator in Control Mode

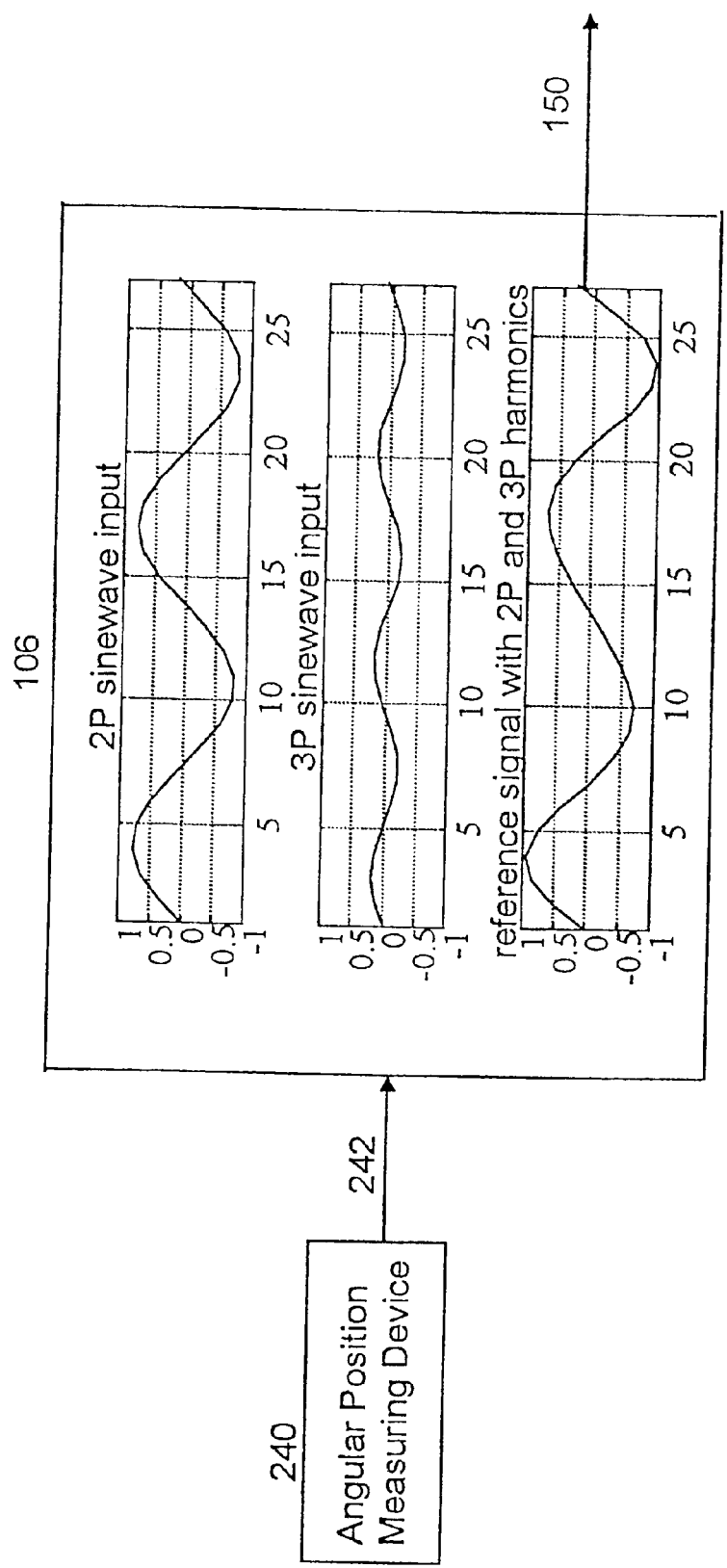
Figure 10 Reference Signal Generator (RSG)

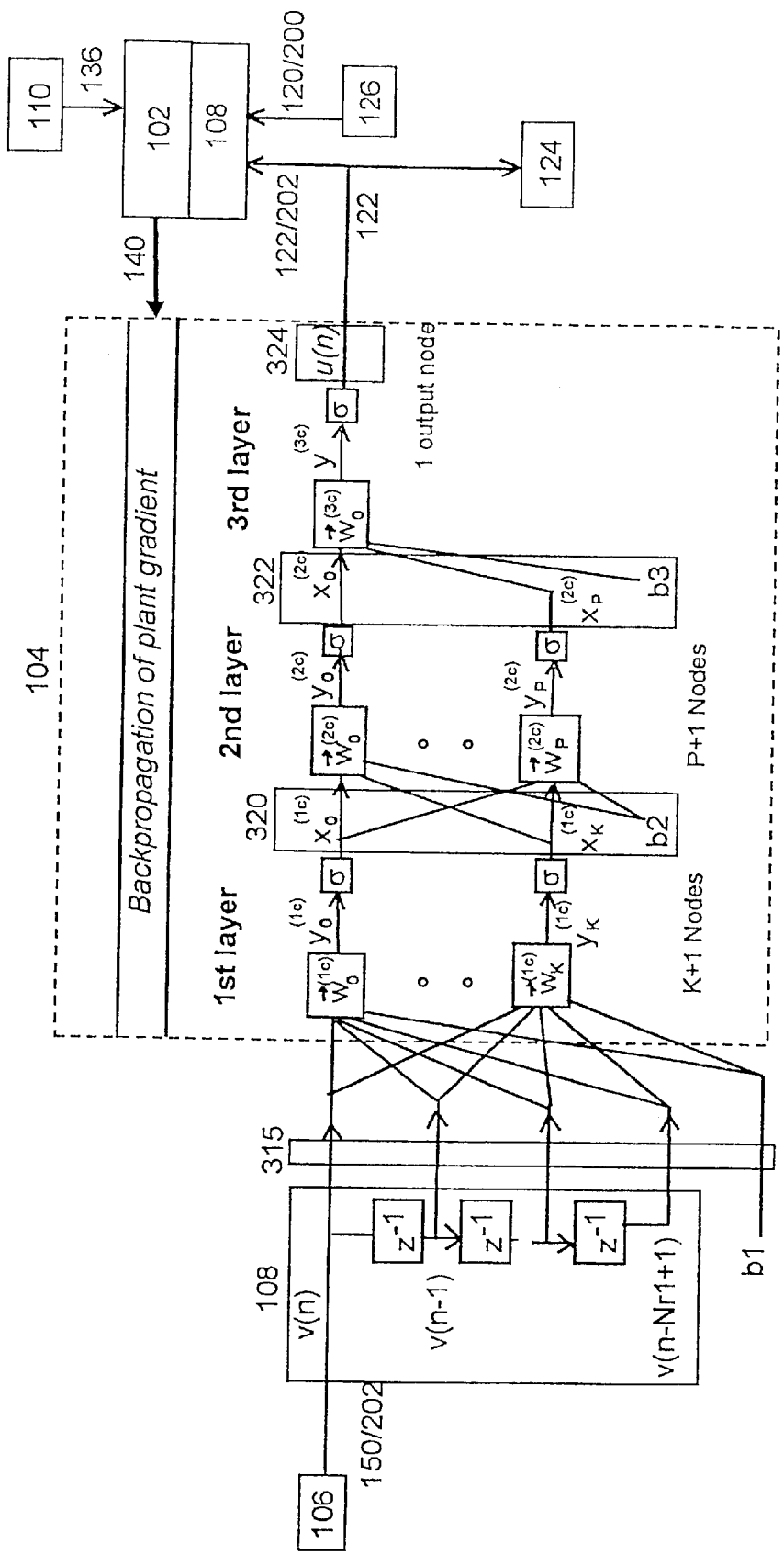
Figure 11 Neural Net Controller

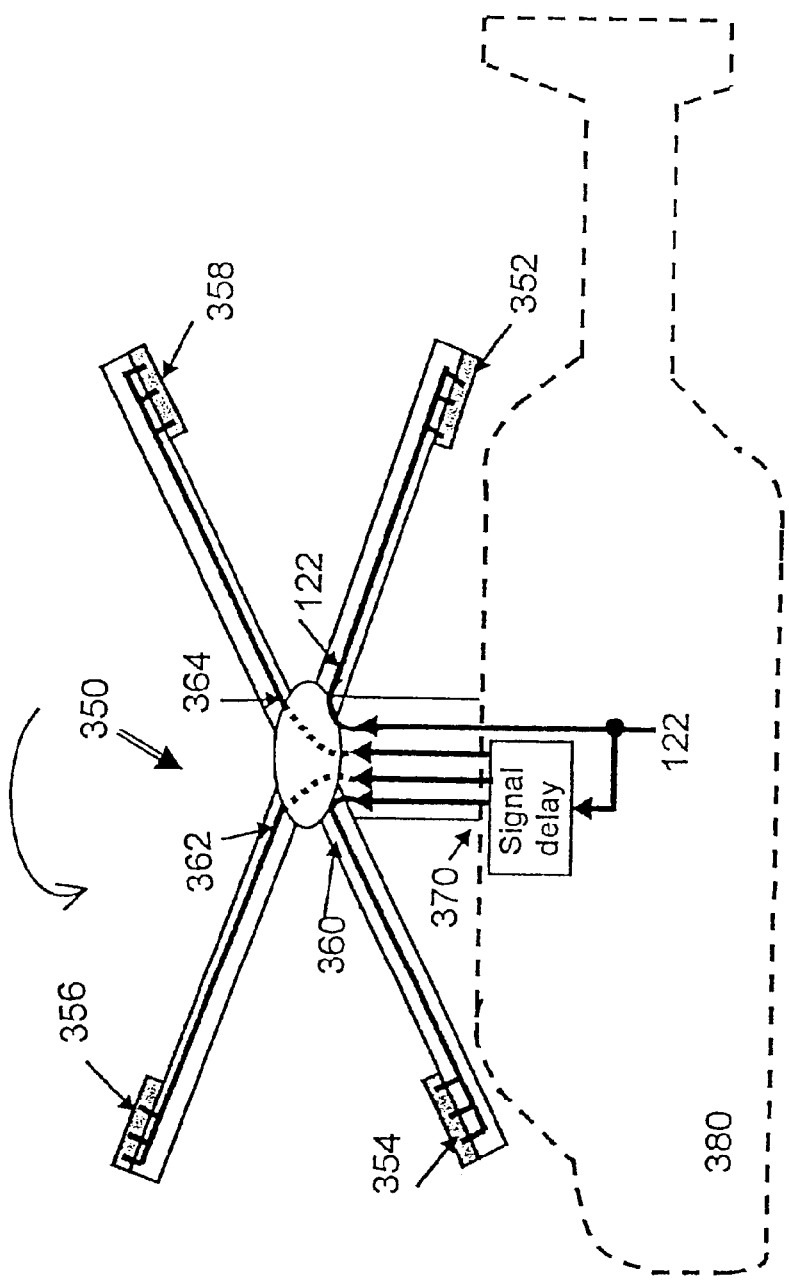
Figure 12 Flap Control Signals For Helicopter Application

NEURAL NET CONTROLLER FOR NOISE AND VIBRATION REDUCTION

This is a Division of Application No. 09/752,180, filed Dec. 12, 2000, now U.S. Pat. No. 6,493,689.

GOVERNMENT RIGHTS

The Government has rights to the invention pursuant to government contract N000014-96-C-2079 awarded by the United States Naval Research Laboratory.

FIELD OF THE INVENTION

The present invention relates to control systems for an active, adaptive vibration and noise attenuation system (AAVNAS). The present invention serves as the intelligence of an overall system that has several parts. Generally, the other parts of the noise control system are called the plant and would include the noise producing system itself, sensors for measuring the objectionable vibration and noise, a mechanism for altering the production of noise and vibration, and some parameter which can be measured independently of the noise and vibration which is related to the noise and vibration production and can serve as an element in the accurate estimation of noise and vibration. In particular, the present invention relates to a control system using neural networks to emulate and control the noise and vibration characteristics of a nonlinear plant.

BACKGROUND OF THE INVENTION

Virtually all dynamic mechanical devices produce vibration which, when transmitted through air within audible frequency ranges, is recognized as audible noise. Both the original vibration and the resultant audible noise have undesirable effects. Vibration in machinery can damage or degrade the machinery's performance. Noise and vibration perceived by people in the vicinity of the machinery may distract those people and cause fatigue or other physical maladies. Consequently, a need exists for systems and techniques which can be used to reduce noise and vibration.

Efforts to control noise and vibration can be classified into two categories: passive and active. Passive noise control techniques are distinguishable from active in that passive techniques are arranged to absorb energy from the plant or, by reason of tuned mounts, isolate the vibrating machinery and thus do not add any energy to the plant, i.e. the system being controlled. Many prior attempts to control noise and vibration utilized passive techniques such as mufflers or sound-absorbing insulation. However, passive noise and vibration control techniques approach practical limits in terms of cost and many other characteristics versus effectiveness. Further significant reductions in noise and vibration levels usually require advances in the state-of-the-art active control technology.

Active techniques seek to analyze the noise and vibration that the plant produces and then reduce the effects by either actively altering the characteristics of the system or by inducing acoustic wave interference accomplished by emitting noises/vibrations at specific time-delayed and phased-reversed frequencies in order to cancel out the noise and vibration from the plant. A more detailed explanation of the physics behind noise cancellation is given in an article entitled "A Primer on Active Sound and Vibration Control" written by Larry J. Eriksson which appeared on page 18 of the February, 1997, issue of "Sensors".

One method known in the art is to measure the noise and vibration disturbances at locations where cancellation is desired and to feed this information back into an active controller which then makes alteration/cancellation adjustments to reduce the noise and vibration disturbances. Feedback systems tend to be effective when the time delay through the controller actuator and sensors is kept to a minimum.

Another method is to place a reference sensor as close as possible to the vibration/noise disturbance producing source in addition to the measurements of the noise and vibration disturbances at locations where cancellation is desired. Such a sensor is referred to as a reference sensor and allows the use of feed-forward algorithms. Feed-forward algorithms such as the Filtered-X Least Mean Squares (LMS) algorithm minimize the measured disturbance signals using a gradient descent algorithm to adapt the coefficient of a FIR (Finite Impulse Response) filter. With feed-forward systems, the FIR filter coefficients are updated so that the transfer function from the disturbance source to the disturbance signals where cancellation is desired, is equal to the net transfer function from the source through the reference sensor, FIR filter, and actuator to the same disturbance signals. The adaptive algorithm computes a FIR filter that best equalizes these two paths. U.S. Pat. No. 5,332,061 issued to Kamal Majeed, on Jul. 26, 1994, discloses one such system used to attenuate vibrations in a vehicle generated by an internal combustion engine. These algorithms are effective when the reference sensors are coherent with the error signals and have a small time delay with respect to the source and when the system controlled is linear. The Filtered-X LMS algorithm is described in the textbook "*Adaptive Signal Processing* by Bernard Widrow and Samuel Stearns © 1985, Prentice-Hall Inc., ISBN: 0-13-004029-0".

Few practical implementations of nonlinear active controllers have been realized. Nonlinear active control systems are required when the actuators and/or the plant exhibit nonlinear dynamics. Neural networks are one method known in the art to model and control the behavior of nonlinear systems. A neural net plant emulator is first trained to identify the nonlinear plant behavior. Then, the neural net controller is trained in real time using the results of the emulator to control the actual noise and vibration disturbance signals. There are many publications on the training of neural nets such as backpropagation (with or without momentum), conjugate gradient, quasi-Newton algorithms and nonlinear Kalman Filtering. One such publication is *Neural Networks—A Comprehensive Foundation* by Simon Haykin, © 1994, Macmillan Publishing Company, ISBN: 0-02-352761-7.

U.S. Pat. No. 5,434,783, issued to Chinmoy Pal, on Jul. 18, 1995, discloses a system incorporating neural networks for use in canceling noise and vibration in an automobile. The Pal patent discloses a system using two neural networks. The "identification" neural net models the behavior of the plant being controlled. The "controller" net calculates the actuator command signals to reduce the automobile interior noise and vibrations of the vehicle body panel. The neural net architecture proposed in this patent includes feedback of the outputs from the neural net (controller or emulator) through ARMA (Auto-Regressive-Moving-Average) models to capture the temporal dynamic behavior of the plant. The output filtered signals from the ARMA models are then used as the inputs to the neural nets. In addition, feedback coupling exists from the emulator output, also filtered by alternate ARMA models to the controller inputs.

U.S. Pat. No. 5,386,689, issued to Daniel J. Bozich, on Feb. 7, 1995, discloses a system similar to Pal, utilizing dual neural networks to control actively vibration in gas turbine engines. This patent discloses the use of two neural nets, an emulator and a controller, to reduce the vibration and noise generated by a gas turbine engine, using actuators and sensors. The emulator in the Bozich patent is used to provide compensation to the neural net controller by using an idea similar to the Fx-LMS algorithm. A reference signal is passed in a feed-forward manner through the emulator to provide a filtered reference signal, which is then used to update the neural net controller weights. The Fx-LMS approach, and hence the approach of the Bozich patent, both assume that the plant (as represented by the emulator) and the controller are interchangeable and this in general is true for linear systems and may be possibly applicable for moderately linear systems.

The flow of a fluid over a surface is one situation in which noise and vibration can occur. Specific examples of this are the blades of a rotorcraft spinning through the air or the blades of a propeller or impeller spinning in water.

A substantial body of research into the noise and vibration generated by helicopter rotors exists. A helicopter emits a substantial amount of noise as it flies over an area. Noise and vibration levels within the helicopter cabin and throughout the airframe can also be significant. The external noise radiated from a helicopter can be generally classified into three areas: loading, thickness and blade-vortex interaction (BVI).

Loading noise results from the rotation of the blades that are creating lift to keep the helicopter airborne. This rotational movement of lift generates noise that propagates perpendicular to the rotor plane, namely down toward the ground directly beneath the helicopter.

Thickness noise also results from the blades rotating around the main rotor shaft, but in contrast is independent of the lift on the blades. Thickness noise results from the pressure disturbances created as a blade passage causes the air to displace and then return to its initial state. The thicker the blades, the more displacement, thus the term thickness noise. These air displacements result in pressure fluctuations that result in radiated noise. Thickness noise radiates in the plane of the rotor, and thus projects ahead of and behind the helicopter. The blade velocity (as noted by the Mach number) also impacts the amount of thickness noise, the faster the blades motion, the greater the noise generated. As the relative speed of the air displacing around the blade approaches the speed of sound (sonic or Mach number=1.0), the magnitude of noise rises sharply (i.e. high-speed thickness noise). When regions of the displaced airflow exceed sonic velocities, the flow is referred to as delocalized, and a great increase in sound levels and radiation is observed. In this situation, the noise is referred to as High Speed Impulsive (HSI) noise. The highest velocity flow is observed on the advancing side of the rotor, and thus the highest thickness noise levels propagate ahead of the helicopter.

As used in this application, HSI noise should be understood to also cover the more general thickness type of noise which may or may not occur at the time that HSI noise occurs. Since the highest Mach numbers are on the advancing side of-the rotors, these noise sources propagate ahead of the aircraft and can result in the helicopter's detection over a battlefield by threat acoustic sensors and mines. Reductions in blade thickness and rotor RPM, thus Mach number, can lead to significant reductions of the noise levels that propagate forward of the helicopter in the plane of its rotor blades, thus reducing the detectability range of the helicopter. However, reductions in blade thickness and tip speed also degrade rotor performance. The addition of active control technology to a rotor with reduced blade thickness and lower rotor RPM may restore or improve the helicopter's performance while yielding significant reductions in noise propagation and thus detection distances.

BVI noise is related to the close interaction of the main rotor blades with the wake vortex elements generated at the ends of the spinning main rotor blades. These interactions increase the far-field ground noise emanating from the helicopter. BVI noise dominates the noise levels when the helicopter is descending or when the helicopter is flying in a terrain-following flight path—sometimes referred to as nap of the earth (NOE) flight profiles. BVI noise is predominantly directed down toward the ground, i.e., perpendicular to the plane of the rotor blades. Such ground noises are undesirable in civilian contexts because they are objectionable to populace in the surrounding area. Such ground noises are also undesirable in military contexts because the noise makes the helicopter more detectable, which makes the helicopter more vulnerable to enemy action. In a military context; a reduction in BVI noise levels during descent or terrain-following flight would greatly enhance the success of missions requiring flight at low altitude in order to evade radar detection, while avoiding detection by acoustic sensors which might trigger anti-helicopter, explosive mines.

These wake vortex elements that lead to BVI noise are also part of a more complex rotor wake structure that varies in time and space over the entire rotor disk. This entire wake structure is also responsible for generating vibratory loads on the rotor system which are transferred through the blades and hub into the airframe and result in undesirable vibrations in the helicopter cockpit and cabin areas.

Open loop aerodynamic simulations have shown that actuating a trailing edge flap on each rotor blade to introduce flap motions at 'N per rev' can reduce BVI noise and vibration. For example, a 2 per rev harmonic signal is twice the speed of rotation of the main rotor of the aircraft and for a rotor rotating at five revolutions per second (300 RPM), the 2 per rev is a 10 Hz harmonic input signal. The flap is typically driven with a superposition of 2 per rev through 5 per rev harmonic input signals. One published paper ("23rd European Rotorcraft Forum in Dresden, Germany, Sep. 16–18, 1997: Individual blade control by servo-flap and blade root control-a collaborative research and development programme", written by D. Schimke, P. Janker, A. Blaas, R. Kube, G. Schewe, Ch. Kebler), describes the use of superimposed harmonics of a base frequency, P, of vibration and sound used to effect cancellation of that vibration and sound. The superimposed harmonics include the 2P through 5P harmonics.

Researchers have also determined that a pressure transducer located on the leading-edge of the blade, at an appropriate blade span location, would correlate well with the far-field noise. One such publication ("19'th European Rotorcraft Forum, Cenobbio, Italy, Sep. 14–16, 1993: Experimental Results of the European Helinoise Aeroacoustic Rotor Test", by W. R. Splettstoesser, G. Niesl, F. Cenedese, F. Nitti, D. G. Papanikas) presents experimental results correlating blade pressure and accoustic characteristics. Experimental noise data in this reference is further evaluated in terms of bandpass levels from 2P–10P comprising the thickness and high speed noise and 6P–40P comprising BVI. Therefore, the output of such a transducer can be used as a noise error sensor for a closed-loop controller for controlling flap position. The aforementioned Schminke paper also discusses the use of pressure transducers at the rotor blades, and the use of wavelet transformation filters to extract the BVI noise signature for closed loop control.

U.S. Pat. No. 5,588,800, issued to Bruce D. Charles, on Dec. 31, 1996, discloses a system for manipulating a flap on a rotor blade to reduce the noise and vibration generated by the rotor. This system alters the flaps in predetermined manners based on the relative angular position of the rotor blade at any given time. The Charles control system is active to the extent that it varies its output depending on the rotor blade position, but does not include a controller to provide real time learning. Without such a controller, the Charles system is unable to optimally adapt its flap control manipulations and provide maximum reduction of noise and vibration emissions based on actual measurements of noise and vibration.

The prior art lacks a comprehensive scheme for actively, adaptively controlling nonlinear noise and vibration by estimating and measuring what noise and vibration outputs will occur based on stimuli that relate to the generating noise and vibration source and then adapting the controlling mechanism to reduce the plant measured noise and vibration disturbances at the desired locations.

SUMMARY OF THE INVENTION

The present invention supplies the control system necessary to model the plant, estimate and measure noise and vibration states, direct the alteration of noise-vibration-generating mechanisms, evaluate its noise-vibration-eliminating performance and adjust its directions based upon detected errors in its plant model.

The present invention is a noise and vibration control system associated with a plant which includes one or more portions of mechanical equipment involved in producing or measuring noise and vibration. The present invention filters and quantifies the noise and vibration generated by the plant. The control system incorporates an emulator neural network used to model the relationship between the quantified noise and vibration measurements and one or more stimuli related to the plant generating the noise and vibration. A second neural network, the controller, uses a reference signal to generate a noise and vibration correction signal which is passed to some means for altering the noise and vibration generated by the plant. The emulator then measures the effectiveness of the correction signal in reducing noise and vibration. The emulator calculates the gradient of the error in its plant model. This gradient is passed to the controller to adapt the calculations used to generate the correction signal. Over time, the parameters within the controller are adapted to produce an optimal adjustment signal reducing the noise and vibrations generated by the plant. The input signals to the emulator and controller are stored in a plurality of time-based filters.

One specific application of the present invention is to control the noise and vibration produced by the blades of a rotorcraft. The noise and vibration is measured by sensors mounted on the rotor blades and throughout the rotorcraft. These sensed signals are then filtered and quantified. An emulator neural network models the relationship between the quantified signals and various stimuli related to the motion of the rotorcraft including the angular position of the rotor relative to the body and the forward velocity of the rotorcraft. A controller neural network uses a reference signal and the current flight regime of the rotorcraft to generate an adjustment signal. This adjustment signal controls flaps located on the blades of the rotorcraft. By adjusting these blade flaps as the blade rotates around the rotor, the controller is able to alter the flow of air across the blades and, thus, alter the noise and vibration generated by that airflow across the blades. The emulator neural network estimates the noise and vibrations resulting from the adjustment signals. These estimates are compared against actual noise and vibration measurements to develop a error gradient in the plant model. This error gradient is then used to adapt the parameters that the controller neural network used to generate the original adjustment signal. As this adjustment occurs during each execution cycle of the controller and emulator, the controller neural network is adapted toward parameters which result in adjustment signals minimizing the noise and vibrations generated by airflow across the rotor blades.

BRIEF DESCRIPTION OF THE DRAWINGS

FIG. 1 illustrates a sample environment in which an adaptive active noise control system according to the present invention is applicable to a helicopter system;

FIG. 2 illustrates a sample environment in which an adaptive active noise control system according to the present invention is applicable to a ship-born system;

FIG. 3 illustrates a sample environment in which an adaptive active noise control system according to the present invention is applicable to a fixed-wing aircraft;

FIG. 4 is an overview of the logic of the present invention and how the invention is arrange in relation to other components of a noise and vibration reduction system;

FIG. 5 illustrates a generalized neural network which forms the basis for the control system of the present invention;

FIG. 6 illustrates the arrangement of an emulator neural network as the emulator is being trained to model the plant;

FIG. 7 illustrates how the components of the a sensed noise and vibration preprocessing unit convert the sensed analog noise into digital form for use in controlling noise and vibration;

FIG. 8 illustrates the use of a digital Hilbert Transform Finite Impulse Response (FIR) filter to generate the envelope of the noise signal;

FIG. 9 illustrates the emulator during the control mode after the emulator has been trained to model the associated plant;

FIG. 10 illustrates a reference signal generator and describes the type of signals generated by the preferred embodiment of the reference signal generator;

FIG. 11 illustrates the controller neural network during the control mode; and

FIG. 12 illustrates the use of a single control signal to control multiple devices which alter the flow of fluid over a surface.

DETAILED DESCRIPTION

Sample Applications

Referring now to FIG. 1, there is shown a system for controlling the noise and vibration lo generated by the rotors of a helicopter similar to that disclosed in the Charles 5,588,800 patent. The helicopter 40 has a number of rotors blades 42, each with a trailing edge flap 44. The flaps 44 can be actuated so as to result in increases and decreases in the lift of the blade as the blade rotates around its drive shaft 46. The actuations of the flaps are timed so as to reduce the overall noise and vibration of the system.

Noise sensors 48 in the form of pressure transducers mounted on at least one blade and vibration sensors 49 in the form of accelerometers mounted within the cabin 50 measure the effectiveness of the reduction efforts. The various sensors 48 and 49 deliver their error signals through connections 51 and 52 to a control system 53 which then controls the positions of the flaps 44 through a control channel 54 so as to minimize the noise and vibration generated by the blades of the helicopter. In this system, the term "plant" is used to refer to the assemblage of the rotor blades 42, an actuator 55, a hydraulic line linkage 56, the flaps 44, and the noise and vibration sensors 48 and 49. In this system, the instantaneous angular position of each rotor blade is calculated as it rotates with drive shaft 46. Noise and vibration production is related to the instantaneous angular position of each blade. Therefore, the instantaneous angular position of the blade is a parameter measured independently of the noise and vibration and is used during the training of the neural net emulator and also in the control mode to provide additional input information to the net to allow estimation of noise and vibration as a function of blade azimuth position. Therefore, the flap 44 actuations occur while the rotor blade is traveling through predetermined regions of the rotor blade's path in order to minimize the noise and vibration generated by the blade in that angular position. Furthermore, additional flight input signals, such as the helicopter forward speed and payload, can also be used to provide flight condition information during the training and learning period of the neural net emulator and controller. As used in this application, the term payload indicates the total weight, including passengers and cargo. These input signal(s) allow the emulator and controller to operate over a wider flight regime.

During the control mode operation, the emulator uses the input flight condition signal(s), the blade position and the flap control signal to effectively estimate the noise and vibration at different flight conditions, thus reducing the time required for re-training the emulator at each operational point in the flight regime. The controller can also use the flight condition signals to retrieve a previously calculated flap control solution and initialize the control algorithm to provide a quick convergence to the optimum solution since the previous (initial) estimate of the flap control is close to the optimum solution. This retrieval could be done from any type of computer based storage medium such as disk drives, tapes or memory chips. The retrieval could also be performed by executing an algorithm developed to provide the optimum solution based on input parameters. Note that the aerodynamic-altering effect achieved by actuating the flaps 44 could also instead be achieved by twisting the blades 42 around their longitudinal axes such as the axis 57 elastically or in a rigid manner.

Referring now to FIG. 2, there is shown a system for controlling the noise and vibration generated by the undesired interaction of two of the four propeller screws of a ship. The ship, having a hull 60, has two screw propellers 62 and 64 on each side each with fixed pitch or variable-pitch propeller blades 66 and 68. Part of the wash or turbulent wake of the forward propeller 62 will, at least at some speed, strike the blades 68 of the aft propeller 64. That wash or wake from the forward propeller can interact with the blades of the aft propeller 64 to generate vibration which can be transferred to the bearings (not shown) of the shaft 69 of the aft propeller. Damage can be done to those shaft bearings, and the vibration can be transferred to the ship's hull 60.

The blade pitch of at least the second or aft-most of the two propellers 64 can be altered so as to change the flow of water flowing over that aft propeller 68. The angular position of the drive shaft 67 of the forward propeller 62 can be measured and used to estimate the fluctuations in fluid flow over the aft propeller 64 which result from the wash of the forward propeller 62. The pitch alterations of aft propeller 64 are timed so as to reduce noise-and-vibration-producing effect that the wake or wash of the first or forward propeller 62 has on the aft propeller 64.

Noise sensors 70 mounted on the propeller blades and vibration sensors 71 mounted within the ship's hull 60 deliver their error signals through connections 72 and 73 to a control system 74 which then controls the pitch of the blades 68 of the second propeller 64 through a control channel 75 so as to minimize the noise and vibration generated. The angular position and pitch of the blades 66 of the first propeller 62 can also be used as indicative input parameters measured independently of the noise and vibration. Additionally, the speed of the ship through the water also effects the noise and vibration generated by both propellers and is a parameter measured independently. In this system, the plant is defined as the propellers 62 and 64, the blades 66 and 68, a hydraulic line linkage (not shown) necessary to drive the pitch variations, the noise 70 and vibration sensors 71.

Referring now to FIG. 3, there is shown a system for controlling the noise and vibration generated in the tail of an airplane as the wake of the airplane's propellers flows over an elevator surface of the airplane. The airplane 80 has one or more propellers 82 with a plurality of blades 84. The rotational angular position of the propeller blades 84 can be measured so as to estimate the resultant airflow wake that will travel in time over the horizontal stabilizer 86 and elevator surfaces 94. The elevator surface has at least one trim tab 88 which can be altered. The alterations of the trim tabs 88 are timed so as to correspond with and cancel out the noise and vibration generated by the pulsation of prop wash as those pulsation reach the elevator surface 94 after being generated by the propeller 82.

Noise sensors 90 are mounted on the elevator and vibration sensors 92 are mounted within the airplane 80 to measure the effectiveness of the reduction efforts. The angular position of the propeller 84 and the speed of the airplane are parameters that are measured independently of the generated noise and vibration. In this system, the plant is defined as the propeller 82, the propeller blades 84, the hydraulic or mechanical line linkage 93 necessary to drive the trim tabs 88 and the noise 90 and vibration 92 sensors. A controller 95 receives the noise sensor signals 90 on connection 89 and the vibration sensor signals 92 on connection 91 as well as propeller positions and airspeed inputs to control the instantaneous position of the trim tabs 88.

Overview of the Invention

Referring now to FIG. 4, there is shown a block diagram of how a control system 100 is arranged in relation to the other portions of an active, adaptive vibration and noise attenuation system (AAVNAS). The control system 100 is based on two neural networks: an emulator neural network (emulator) 102 and a controller neural network (controller) 104. Additional devices facilitate transferring inputs and outputs to and from the emulator 102 and controller 104 including: a reference signal generator (RSG) 106, time-based filter elements 108 and 109 for the inputs to the emulator and controller, a sensed noise and vibration pre-processing unit (SNVPU) 110, and a summing unit 112. Inputs to the control system 100 include the sensed noised and vibration signals flowing on connection 114 from one or more noise and vibration sensors 115 as well as one or more parameters received from a parameter sensor(s) 126 which sense the noise-independent parameter, e.g. angular position of a rotor blade (as measured by the sine and cosine of the angle relative to some reference point on the rotor shaft)

received on connections 120, 121, and forward velocity of the vehicle received on connection 119 (vehicle operation-condition input signal), which are measured independently of the noise and vibration and which are at least partially indicative (predictive) of the noise and vibration. The outputs of the parameter sensor(s) 126 are furnished on connections 119, 120, and 121. The control system generates an output control signal flowing on a connection 122, which is used to drive a flap or other altering-device 124 so as to change the generated and thus sensed noise and vibration received on connection 114 from the sensors 115, and is also used as one of the inputs to the emulator time-based filter 108 for estimating the plant noise and vibration using the emulator.

See below for details on each step in the following processing. First the matrix coefficients of the neural net controller 104 are initialized with small random values, and the matrix coefficients of the emulator 102 are initialized with the pre-computed values obtained from the neural net emulator training process to model the dynamics of the plant 130 (see FIG. 65. The initial state "k=0" (explained below, in this paragraph) is initiated by the first sample clock of an A/D converter (described in connection with FIG. 6) and begins with the reference signal generation by the RSG component 106 on connection 150 and the forward velocity signal (indicative of operating condition) on connection 119 (in this context, "k" represents the current frame count of the system and is incremented by 1 for each subsequent A/D sample clock cycle). The reference signal on connection 150 and the forward velocity signal 119 are placed into a time-based filter and 109 (for example, digital tapped delay lines) at the input of the controller 104. During this initial state, the controller does a forward pass of the values stored in the time-based filter and 109 through the calculations performed on its neural network. This forward pass computes the output control signal on connection 122, which is connected to both the altering-device 124 and the input time-based filter 108 of the emulator 102. The output control signal is delivered to the altering-device 124 and to the emulator time-based filter 108 during the next A/D sample clock cycle.

The next state "k=1" is initiated by the next A/D sample clock and the process begins by first delivering the control signal computed during the k−1 state to the altering device 124 and to the time-based filter 108 of the emulator. New indicative parameters are received on connections 119, 120, and 121 (e.g. vehicle forward velocity, sine and cosine of the blade angular position), and a new reference signal is received on connection 150. The signals on connections 119, 120, and 121 are placed into the time-based filter 108 (e.g. the tapped delay lines) of the emulator 102, and signals on connections 119 and 150 are placed into the time-based filter 109 of the controller 104. During this state, the emulator does a forward-pass of the values placed in the input filter 108 through the fixed matrix coefficients from the emulator training process as to constitute its neural network simulation capability and produces an estimate of the noise and vibration signal on connection 134 which is sent to the summing unit 112. During this state, the measured noise and vibration signals on connection 114 are also processed in the sensed noise and vibration preprocessing unit (SNVPU) 110 and are delivered on connection 136 to the summing unit 112 as digitized noise envelope and vibration signals.

The differences in the sensed and estimated noise and vibration signals 138 are calculated in the summing unit 112 and are used to assess, in real time, the emulator accuracy to the actual plant process and to determine whether emulator re-training is necessary (see below for options if re-training is necessary). The sensed digitized noise envelope and vibration signals on connection 136 from the SNVPU 110 are also returned to the emulator 102. The emulator 102 then backpropagates these signals carried on connection 136 through its network in order to calculate the gradient of the plant error signals with respect to the input control signal received on connection 122. The plant error gradient is then sent to the controller 104 on connection 140. The controller uses a gradient-based algorithm (see the Controller section below) to backpropagate the plant error gradient through its neural network and adapt its matrix coefficients in layers 3, 2 and 1 (see Emulator in Control Mode and Controller sections). The controller can now do a forward pass of the filter tapped delay line reference values 109 through its updated neural net matrix coefficients and calculate a new output control signal for the next state carried on the connection 122. When the next A/D sample clock cycle occurs, "k" is incremented and the described processing sequence in state "k=1" repeats itself with each succeeding clock cycle.

If the emulator modeling of the actual plant process is not accurate enough (based on the differences in the sensed and estimated noise and vibration), retraining may be necessary (see Training the Emulator section below). The AANVAS may indicate this inaccuracy to the user such devices as warning lights or computer printouts (on a monitor, printer, or any other type of computer output device). The user can then immediately halt the plant process and reinitiate the emulator training procedure, or the user can note the need for retraining and defer the retraining procedure until a more convenient time.

Generalized Neural Network Description

Both the emulator 102 and the controller 104 have feed-forward, multi-layer architectures with input tapped delay lines 108 and 109 to capture the temporal dynamic behavior of the plant required for control of a dynamic system. In the preferred embodiment, the neural net processors (emulator 102 and controller 104) have three-layer architectures.

Referring now to FIG. 5, there is shown a generalized three-layer, feed-forward neural net processor. The neural net of FIG. 5 has four inputs, (indicative/predictive) parameters h1, h2, and h3 received on a connections 199, 200, and 201 (e.g. forward velocity of the vehicle, sine and cosine of the main rotor angular shaft position) and an input signal y received on a connection 202. The number of indicative parameters is at least one and can vary according to the particular application and should not be seen as a limitation on the present invention. Each indicative parameter assists the neural network in building relationships useful to model and control the nonlinear plant dynamics at different vehicle operational points.

The nature of the input signal y received on connection 202 depends upon whether the neural net of FIG. 5 is functioning as the emulator 102 or the controller 104. Also, the input signal y received on the connection 202 to the emulator 102 depends upon whether the emulator 102 is in its initial "plant model training" regime or is performing in its "adaptive control" regime during active control of the active, adaptive vibration and noise attenuation system (AAVNAS). The nature of these input signals, y, received on connection 202 and the "regimes" under which the neural net is being trained or used in adaptive control mode are described in more detail below.

The input signal y received on connection 202 and input signals h1, h2, and h3 received on connection 199, 200, and 201 are stored in time-based filter elements 108, preferably in the form of delay lines. These delay lines are similar to shift registers in which the current input signal is shifted in, each previously-stored input signal is shifted forward, and the input signal from N frames is shifted out where N represents the number of available storage positions in the tapped delay lines. The shifting is done at the beginning of each frame shortly after the start of the A/D clock cycle has occurred. These delay lines filter the inputs to both the emulator 102 and controller 104 neural networks and provide a time-based history of N signal values.

The generalized neural net of FIG. 5 preferably contains three layers, with the first layer output vector $x1=[x_o^{(1)}, x_1^{(1)}, x_2^{(1)} \ldots x_Q^{(1)}]^T$ (T denotes transpose), the second layer output vector $x2=[x_o^{(2)}, x_1^{(2)}, x_2^{(2)} \ldots x_M^{(2)}]^T$, and the third layer output vector $x3=[x_o^{(3)}, x_1^{(3)}, x_2^{(3)} \ldots x_L^{(3)}]^T$. Each layer includes a matrix formed by the several row vectors in that layer. For example the matrix in the first layer is formed by the row vectors $w_o^{(1)}$ through $W_Q^{(1)}$, where the dimension of each row vector is $1 \times (N_1+N_2+N_3+N_4+1)$ resulting in a matrix with dimensions $(Q+1) \times (N_1+N_2+N_2+N_4+1)$. The input signal y(n) to the first layer is delayed by $N_1-1$ samples and the forward velocity signal h1(n) and blade sine and cosine position signal h2(n) and h3(n) are delayed by $N_2-1$, $N_3-1$, and $N_4-1$ samples, respectively, (for example, in FIG. 5, $N_2-1=2$ for a two-sample delay), and an input bias b1 is included to form a total input vector of dimension $(N_1+N_2+N_3+N_4+1) \times 1$. This input vector is multiplied with the matrix in the first layer (formed by row vectors $w_o^{(1)}$ through $w_Q^{(1)}$) resulting in the intermediary output vector y1 with elements $y_0^{(1)}$ through $y_Q^{(1)}$. This vector is then multiplied element-by-element with a vector of sigmoidal functions producing the first layer output vector x1. The sigmoidal function preferably used in this neural net is defined by:

$$\sigma(y) = \frac{1-e^{-y}}{1+e^{-y}} \quad (1)$$

The same process is then repeated for the second layer in which the input vector is now defined by the output of the sigmoidal functions from the first layer which are $[x_o^{(1)}, x_1^{(1)}, x_2^{(1)} \ldots x_Q^{(1)}]$ and a bias b2. This vector multiplies the matrix formed by rows $w_o^{(2)}$ through $w_M^{(2)}$ in the second layer whose dimension is $(M+1) \times (Q+2)$ where M+1 is the number of nodes in the second layer and Q+2 is the number of input channels into the second layer. The third layer performs similar operations, and the output vector with elements $[x_o^{(3)}, x_1^{(3)}, x_2^{(3)} \ldots x_L^{(3)}]$.

In the emulator version of the generalized neural network, the output vector with elements $[x_o^{(3)}, x_1^{(3)}, x_2^{(3)} \ldots x_L^{(3)}]$ is summed with the digitized output sensor signals [sensor$_0$, sensor$_1$, ... sensor$_L$] in summing unit 112 to produce outputs $[e_0, e_1, \ldots e_L]$, which constitute the outputs of the neural net.

In the preferred embodiment, the processing described above and shown in FIG. 5 is performed at 512 Hz, which is the sample rate of the neural net emulator and controller process. The sample rate is also the same as the A/D clock rate. Each delay $z^{-1}$ is one sample interval. Therefore, in the preferred embodiment, the output of the third delay of the input signal y (stored in input filter element y(3)), is 3/512 of a second later than the input signal y that gave rise to it.

Training the Emulator

Referring now to FIG. 6 there is shown an arrangement for the emulator 102 in its training mode to learn the plant 130. In using the present invention to control an AAVNAS, the first operation is to train the emulator 102 to model the plant nonlinear dynamics. Methods of plant identification for linear systems are well known in the art. One example of such methods is described in U.S. Pat. No. 4,677,676, issued to Eriksson on Jun. 30, 1987 ('676 patent). To model a linear system at specific frequencies, only one amplitude/phase sinusoid input is required per frequency since with different amplitudes, the output is linearly related. However, to model nonlinear systems, the present invention generates various random samples of amplitude/phase per frequency to determine adequately the nonlinear input/output mapping at each frequency.

Training a neural net is a process that begins with a synthesized probe signal. In the preferred embodiment, a multi-harmonic multi-pattern signal is used as the probe signal and is composed of uncorrelated patterns. Each pattern is generated by the superposition of one or more harmonics, with the amplitudes and phases generated by random number generators; and the pattern is repeated for a number of cycles to provide adequate duration of plant excitation. In the preferred embodiment, the number of harmonics is seven (1P–7P). Each pattern in the probe signal is generated by re-running the random number generators to provide an alternate set of fourteen random amplitudes and phases. The number of patterns required for training the neural net is based on how well the emulator can generalize with patterns not used during training. If the generalization is poor, the number of patterns is increased until the neural net achieves adequate generalization. This probe signal is constructed in the controller 104 and is delivered on connection 222. The excitation signal on connection 222 is delivered through a D/A converter 224 to control the mechanism of the altering device 124 to the physical portions of the system to be controlled.

During the training process, the system under control is operated in its customary environment, and the outputs of the plant noise and vibration sensors 115 are gathered. The plant reacts to the changes in the altering-device 124 created by the probe excitation signal on line 222. In the helicopter example described above and shown in FIG. 1, the helicopter would be operated at several predefined flight conditions for a specified flight regime while the flaps 44 are actuated by the excitation signal (described above), and the noise and vibration sensors record the changes that occur due to the flap actuations.

The sensed and gathered (processed and summed) noise and vibration signals are then related to the input excitation signal on connection 222 driving the altering-device 124, and to the indicative parameters on connections 119, 120, and 121. This data-collection process is done during normal operation of the system. In one embodiment, the collected data are stored by means of a mass computer storage device such as a magnetic tape or disk drive. The data are then analyzed off-line to build the relationship between input and output data. Alternatively, the data need not be collected and then processed off-line but can be processed through the neural net in real time, thereby obviating voluminous data collection. The preferred embodiment of the present invention uses the real time neural net emulator processing to build the input/output data relationship.

FIG. 6 assumes real-time processing of the sensed noise and vibration signals on connection 114 from the changes in the altering-device 124 driven with the multi-harmonic multi-pattern excitation signal on connection 222 generated in the controller 104. The sensed noise and vibrations on connection 114 are delivered to the SNVPU 110 which processes the sensed noise and vibration into digitized noise envelopes and vibration signals. Those signals are transferred on a connection 136 to a plurality of summing circuits 112. This processing by the SNVPU 110 is described in greater detail below.

In the preferred embodiment of the present invention, the processing in the emulator 102 and controller 104 (described below) is performed at 512 Hz. The probe signal on connection 122 and indicative (predictive) parameter signals on connections 119, 120, 121 are also sampled at 512 Hz. These digital signals appear at the input time-based filters 108 to the emulator 102. The emulator 102 of FIG. 6 is in the form of the neural net circuit of FIG. 5. The probe signal on connection 122 and indicative (predictive) parameter signals on connections 119, 120, and 121 of FIG. 6 correspond to the input signal y on connection 202 and the parameter signals h1, h2, and h3 on connections 199, 200 and 201, respectively, of FIG. 5. The summing circuits 0–L of FIG. 5 correspond to the summing circuit 112 of FIG. 6. The emulator 102 estimated noise and vibration outputs transmitted on connection 134 of FIG. 6 corresponds to the output signals $[x_o^{(3)}, x_1^{(3)}, x_2^{(3)} \ldots x_L^{(3)}]$ from the third layer of the neural net of FIG. 5 and is delivered as a negative input to the summing circuit 112. Therefore, the difference between the measured noise and vibration signals [$sensor_0$, $sensor_1$, ... $sensor_L$] 136 and the emulator 102 estimated noise and vibration outputs 134 are the error signals that are delivered as the adjustment input to the emulator 102 on connection 138 to adjust the many matrix multiplication coefficients of the layers of nodes of the neural net circuit of FIG. 5. As stated above, the number of indicative parameter signals could be one or more depending upon the specific application in which the AANVAS is used.

The ways that error signals are used to adjust the multiplication coefficients of a neural net are well known and available from several texts on neural net circuits. Two textbook examples are:

(1) *Neural Networks—A Comprehensive Foundation* by Simon Haykin, © 1994, Macmillan Publishing Company, ISBN: 0-02-352761-7; and
(2) *Neuro-Control and its Applications* by Sigeru Omatu, Marzuki Khalid, and Rubiyah Yusof, © 1996, Springer-Verlag, ISBN: 3-540-19965-9.

The Haykin reference provides a description of neural net architectures and training. The Omatu, et al. reference describes applications of neural nets used in industrial control systems.

To train or teach the emulator 102, the error outputs (in the form of difference signals) from the summing circuits 112 of FIG. 6 are used with a backpropagation algorithm or with nonlinear optimization algorithms such as quasi-Newton, conjugate gradient or Kalman filtering techniques to adjust the multiplier coefficients of the emulator 102 until the emulator produces an estimate signal within a arbitrary error tolerance E(l) to the output of the SNVPU 110, from the sensed noise and vibration received on connection 114. When that happens, the emulator 102 is said to have "learned" how to emulate the sensed noise and vibration received on connection 136. In this way, the emulator 102 learns to model the intricate nonlinear and time-varying dynamics of the plant 130 from the input probe signal to the changed altering-device states through to the noise envelope and vibration signals.

The Indicative Parameters

Selection of the input parameters is important to the efficiency of the system in modeling and controlling noise and vibration. Each indicative parameter should be a value that is related to the plant noise and vibration which is being controlled at the various operational points of the vehicle.

One advantage of the present invention is its ability to use different indicative parameters to allow the AAVNAS to reduce noise and vibration over a variety of operating conditions using the same neural network topology. For example, in the helicopter application described above, the forward velocity of the helicopter is one candidate indicative parameter. The system can operate without the velocity input signal at specified discrete operational points. However, at the in-between operational points, that is during transition from one operational point to the next, the system would not perform as well since the plant noise and vibration change from one operational point to the next, and the emulators are trained to predict noise and vibration only at the specified operational points.

In the helicopter example, assume the following operational points: BVI noise at 80 knots, vibration at 120 knots, and HSI noise at 160 knots. These are three operational points, so we would have to train three emulators to operate at the specified points. However, the system would not function as well during the transition from one operational point to the next since the emulators are only applicable at the trained points. To provide continuous operation of the system from 80 knots–160 knots, we may have to train eight (or more) emulators to provide plant noise/vibration emulation at eight operational points within the flight regime of 80–160 knots. It should be realized that the actual number of plant emulators required to be trained for a specified flight regime will be dependent on how much the plant noise and vibration dynamics vary as a function of forward velocity and this must be determined from data analysis. In this example, one solution would be to have the emulators downloaded and switched at ten knot increments (based on some input velocity signal) and some form of emulator interpolation would still have to be done for the in-between points. This approach may work, however instead of storing in memory eight different emulators (for the previous example), downloading emulators and interpolating for in-between points, one alternative and better solution is to train one emulator for all eight operational points, by using an input velocity signal during the training process. Once trained at the eight operational points, the neural net emulator should be able to retrieve the appropriate plant emulation based on the input velocity signal. In addition, for the in-between points, the neural net emulator will automatically provide the necessary interpolation. So, with this approach, there is no need to store (eight or more) emulators in memory, download the appropriate emulator or do the interpolation.

For vehicles that operate at one operational point in the flight regime, there is no need for a velocity input signal. For vehicles that have to operate over a flight regime at multiple operational points, for optimum results, the control system should run continuously. The robust/efficient approach is to use a velocity input signal and maybe other inputs as well like payload, to provide the proper plant emulation at the multiple operational points and automatic interpolation for the in-between points during the continuous operation of the system. Neural nets do this interpolation very well.

Preprocessing the Noise and Vibration Input Signals

Referring now to FIG. 7, there is shown a block diagram of the sensed noise and vibration preprocessing unit (SNVPU) 110. The basic raw form of the sensed noise and vibration signals is a large collection of values representing the intensity of the noise or vibration. In order to evaluate the noise and vibrations being produced, the noise and vibration must be reduced into digital quantitative values which are then evaluated with an objective function. The SNVPU 110 performs this reduction by isolating the noise or vibration sensed by sensors 115 at particular target frequencies and quantifying the value of the signal being sensed at each of those target frequencies.

The SNVPU 110 receives sensed noise and vibration signals in analog form on connection 114 from the sensors 115. In the preferred embodiment, the analog sensor signals on connection 114 are first digitized in the A/D converter 231 and bandpass filtered in the signal processor 232 in order to extract (i) the frequency bandwidth of the noise signature and (ii) the vibratory loads at the vibration frequencies desired to be controlled. Bandpass filter design is well known. One method of creating this filter 232 is by using a software tool called Matlab produced by a company called The Math Works, Inc., 24 Prime Park Way, Natick, Mass. 01760-1500 (508) 647-7000. In the preferred embodiment, this filter is a digital infinite impulse response (IIR) implemented in software on a DSP (digital signal processor).

The digital vibration signals are sampled at the execution rate of the controller and emulator (in the preferred embodiment this rate is 512 Hz) and are bandpass filtered in signal processor 232 as previously described to generate the desired vibratory loads. The bandpass filtered vibration signals obtained from multiple cabin locations are then transmitted to the summing circuit 112 on connection 136.

The digital noise signals to be controlled are highly variable and are sampled at a rate higher than the execution rate of the controller and emulator. In the preferred embodiment, this digital noise signal sample rate is 2560 Hz. To reduce the DSP processing computational requirement, the noise signals are transformed to baseband frequencies using a Hilbert Transform digital envelope detector. The controller is then used to reduce the BVI noise envelope signals rather than the highly variable noise signals, thus reducing the overall DSP computational requirement. To generate the noise envelope signals, the digital noise signals are first bandpass filtered in signal processor 232 to pass only the BVI frequency band signature. The signals that exit the bandpass filter are then analyzed in a Hilbert Transform envelope detector filter 234 to identify the envelope of the noise signal loci. Noise sensor signals at multiple locations on the blade are processed through the envelope detector, and the resulting noise envelope signals are then transmitted on the connection 136 to the summing circuit 112.

Identifying a signal envelope is conceptually like detecting an AM radio signal, but with digital data signals. The block diagram in FIG. 8 describes the Hilbert Transform envelope detector. The upper path generates the Hilbert Transform of the input noise signal (.i.e., xhat) by filtering the input noise through a FIR (Finite Impulse Response) Hilbert Transform digital filter. The textbook "*Digital Signal Processing* by Alan Oppenheim and Ronald Schafer, © 1975, Prentice-Hall Inc., ISBN: 0-13-214635-5" describes one method to derive the weights of the FIR Hilbert Transform filter. The FIR Hilbert Transformer adds a delay of (K−1)/2 taps (K is the FIR filter length). The lower path of the block diagram compensates for this delay by introducing a pure delay of (K−1)/2 to the input noise signal. The noise envelope signal is then generated by taking the square root of the noise power obtained by summing the power of the Hilbert transformed signal and the original delayed signal (i.e., sqrt(x^2+xhat^2)). The envelope of the noise signal on connection 135 is then lowpass filtered and decimated, since the baseband signal envelope in the preferred embodiment has a narrow frequency bandwidth in relation to the sample rate of the A/D converter, and delivered on connection 136 to the summing circuit 112. In the preferred embodiment the A/D sample rate for the input noise signals is at 2560 Hz and the processed noise envelope signals are decimated or reduced in numbers by a factor of five down to the 512 Hz sample rate processing of the neural net emulator and controller.

In the preferred embodiment, there are a plurality of noise and vibration sensors. For each of the sensors, there is one or more of the combination of IIR and FIR filters which isolate the noise or vibration being transmitted at the desired frequency bands and quantify the value of the signal being transmitted. The quantified value is then analyzed against the estimated noise and vibration values from the emulator 102 to determine the error in the plant model.

Once the sensed noise and vibration signal has been quantified, that quantified value is numerically combined with quantified values from the other signals in an objective function. This objective function is the quantified summation of the actual sensed noise envelope and vibration signals desired to be reduced or suppressed. The objective function represents a "strength" measurement of the objectionable noise and vibration and, as such, is one possible criterion by which the efficacy of the control efforts is judged. One skilled in the art could easily derive other criteria related to the reduction of noise and vibration by which to judge the efficacy of the control efforts. By reducing the resultant value of the objective function, the AAVNAS has necessarily reduced the objectionable noise and vibration. In the emulator training mode, the emulator is trained to generate an output that is an estimated value representing the results of the vibration and noise envelope signals. In the control mode, the controller 104 is adapted to produce control signals to the altering-device to minimize the objective function value calculated from the noise and vibration signals that occur after the altering-device has been changed via the control signals. In the preferred embodiment, with five vibration sensors and two noise sensors, that objective function has the exemplary form of:

$$\text{Objective Function} = J = a1*[(k1*Fx^2)+(k2*Fy^2)+(k3*Fz^2)+$$

$$(k4*Mx^2)+(k5*My^2)]+$$

$$a2*[(k6*P1^2)+(k7*P2^2)]=$$

$$a1*(\text{vibration\_objective\_function})+$$

$$a2*(\text{noise\_objective\_function}) \qquad (2)$$

Fx, Fy, Fz, Mx, and My are the digital vibration measurements at the desired frequency (i.e., 4P for helicopter fixed frame hub loads). One example of vibration measurements comprises the readings from accelerometers mounted in the cabin of a helicopter measuring the cabin forces and moments.

P1 and P2 are noise envelope measurements. One example of noise measurements comprises the readings from pressure transducers mounted on the rotor blade of a helicopter.

k1–k7, and a1–a2 are weighting coefficients which allow the active, adaptive vibration and noise attenuation system (AAVNAS) to emphasize certain components more than others (i.e., k1–k7) and also emphasize more the vibration or noise objective function (a1, a2).

The objective function describes what the controller is to reduce. For example, with a1=a2=0.5, the AAVNAS equally reduces the power of the vibration signal and the power of the noise envelope. Different weights can be used to obtain a trade-off between noise and vibration reduction.

Emulator in Control Mode

It has been suggested in the reference by Nguyen D. and Widrow B. {"*The truck backer-upper: an example of self-learning in neural networks*", (1989), *Proc. Int. Joint Conf. On Neural Networks, Washington D.C., Vol.* 2} that a neural network could be used to emulate a nonlinear plant, and the trained emulator could therefore be used as a channel for the backpropagation of errors to provide the plant gradient information to allow adaptation of the neural net controller matrix coefficients via a gradient descent algorithm. This approach is also used herein to provide adaptation to the neural net controller. Referring now to FIG. 9, there is shown a block diagram of the emulator 102 during the control mode (after the plant model training has occurred) in the preferred three-layer embodiment. In the control mode, the emulator 102 is not adaptive; and the emulator weighting coefficients stored in the row vectors 300 are fixed.

During the emulator forward pass, the output control signal u(n) received on connection 122 corresponds to the y input signal received on connection 202 in FIG. 5; and the (indicative/predictive) parameter signals (e.g. the forward velocity and the sine and cosine of the rotor shaft angular position) received on connections 119, 120, and 121 correspond to the h1, h2 and h3 references received on connection 199, 200, and 201 in FIG. 5. These inputs go through tapped delay lines 108. The content of the delay lines 108 is stored as the vector $x_{in}$(=[u(n), u(n−1), . . . u(n−Nu1+1), h1(n), h1(n−1), . . . h1(n−N2+1), h2(n), h2(n−1), . . . h2(n−N3+1), h3(n), h3(n−1), . . . h3(n−N4+1), b1]$^T$) in memory location 280, as described in connection with the u(n), h1(n), h2(n) and h3(n) delayed signals in FIG. 9. In the preferred embodiment, the input vector contains all of the delayed values stored in the time-based filter 108. However, an alternate embodiment would be to compose the input vector from selected values stored in the time-based filter 108.

The input vector is processed in a forward direction ("forward pass") through the fixed row vectors 300 of the emulator 102 producing the sigmoidal function output vectors on a layer-by-layer basis at the first layer x1 stored in memory location 310, second layer x2 stored in memory location 312, and third layer x3 stored in memory location 314. At each layer, these outputs are stored in memory locations 310 and 312 and 314 and are used during the backpropagation of sensor signals [sensor$_0$, sensor$_1$, sensor$_2$ . . . sensor$_L$] received on connection 136 to generate the gradient of the instantaneous objective function with respect to the input control signal which is passed to the controller on connection 140. The following equations summarize the backpropagation of the error signals used in the present invention to provide gradient information to the neural net controller. Defining the summed squared errors at the system output as the objective function to be minimized with the neural net controller by:

$$J = \sum_{l=0}^{L} \left[ \left( \sqrt{c_l} \cdot d_l(n) \right)^2 \right] = \sum_{l=0}^{L} e_l(n)^2 \quad (3)$$

$c_l$ are the objective function weights (for the exemplary form in equation (2), (c1=a1*k1, c2=a1*k2, . . . c5=a1*k5, c6=a2*k6, c7=a2*k7), $d_l$(n) are the vibration and noise sensor sinals [Fx, Fy, Fz, Mx, My, P1, P2], $e_l$ are the error signals to be minimized by the controller and l=0,1, . . . L (L=7 in equation (2)). The gradient of the objective function with respect to the 'j'th tap' input control signal u(n−j) (where j=0,1, . . . Nu−1) can be shown to be:

$$\frac{\partial J}{\partial u(n-j)} = \sum_{q=0}^{Q} w_{j,q}^{(1)} \delta_q^{(1)}(n) \quad (4)$$

The weight $w_{j,q}^{(1)}$ is the 'j–q' fixed coefficient that relates input j to output neuron (a neuron is a node or element within the network) q in the first layer of the emulator, and the corresponding gradient at the q'th node in the first layer is:

$$\delta_q^{(1)}(n) = \frac{\partial J}{\partial y_q^{(1)}(n)} = \sigma'(y_q^{(1)}(n)) \cdot \sum_{m=0}^{M} w_{q,m}^{(2)} \delta_m^{(2)}(n) \quad (5)$$

Similarly the gradients at the m'th node in second layer and at the l'th node in the third layer of the emulator are:

$$\delta_m^{(2)}(n) = \frac{\partial J}{\partial y_m^{(2)}(n)} = \sigma'(y_m^{(2)}(n)) \cdot \sum_{l=0}^{L} w_{m,l}^{(3)} \delta_l^{(3)}(n) \quad (6)$$

$$\delta_l^{(3)}(n) = \frac{\partial J}{\partial y_l^{(3)}(n)} = 2 \cdot \sigma'(y_l^3(n)) \cdot e_l(n) \quad (7)$$

$$= 2 \cdot \sigma'(y_l^3(n)) \cdot \sqrt{c_l} \cdot d_l(n);$$

$$d_l(n) = sensor_l(n)$$

The weight $w_{q,m}^{(2)}$ is the 'q–m' coefficient that relates the q'th input from the first layer to the m'th neuron in the second layer, and $w_{m,l}^{(3)}$ is the 'm–l' coefficient that relates the m'th input from the second layer to the l'th neuron in the third layer. There are (Q+1)×(Nu1+N2+N3+N4+1) coefficients in the first layer, (M+1)×(Q+2) coefficients in the second layer and (L+1)×(M+2) in the third layer including the bias weights. The derivative of the activation function is:

$$\sigma(y_k^{(i)}(n)) = 1 - x_k^{(i)}(n) \cdot x_k^{(i)}(n) \quad (8)$$

where $x_k^{(i)}$ is the output of the activation function at the i'th layer (i=1,2,3) for node k with Q+1 nodes in the first layer, M+1 nodes in the second layer and L+1 nodes in the third layer. These signals $x_k^{(i)}$ are computed and stored in column vectors x1, x2 and x3 at location 310, 312 and 314 during the forward pass through the emulator, and are used during the reverse pass to compute the reverse pass gradients. The reverse pass starts with the backpropagation of the sensor signals on connection 136 in the third layer to compute the gradient at the output of the emulator using equation (7), this allows the gradient computation to be determined at the second layer using equation (6), at the first layer using equation (5) and then equation (4) determines the instantaneous plant gradient with respect to the j'th input control signal in the delay line. This gradient is then delivered on connection 140 to the controller 104 to allow the adaptation of the neural net controller matrix coefficients using a temporal backpropagation gradient algorithm (see Controller section, below).

Furthermore, the estimated noise envelopes and vibration signals stored in memory location 314 are negated and added to the digitized sensed noise envelopes and vibration signals [sensor$_0$, sensor$_1$, sensor$_2$, . . . sensor$_L$] on connection 136 to verify that the emulator (fixed coefficients) produces an estimate signal within an arbitrary error tolerance E(l) on connection 138, thus making it valid to use the data stored in memory locations 310, 312 and 314 for backpropagation of the error sensors to generate the plant gradient using equation (4).

The Reference Signal

FIG. 10 illustrates how the angular rotor position is used to create the input reference signal to the neural net controller. The reference signal generator 106 uses the angular position of the rotor to create sinusoids of harmonics of rotor frequency P. In the preferred embodiment, the angular position of the rotor is transmitted from a measuring device 240, (e.g., a sensor connected to the rotor on a helicopter to measure the rotor position) on connection 242. One example of such a sensor is the cam with one or more lobes with an associated cam-following switch such as has been used in the past on distributors for automobiles. Another example of such a sensor is a photoelectric disk with an associated light sensor. The disk has differing reflective properties such as white stripes extending radially from the center. The light sensor detects the differences in the photoelectric disk and uses these differences to calculate an angular position. Another example of such a sensor is a starwheel with an associated magnetic sensor, as used in the distributors of new automobiles. The starwheel has one or more teeth along the outside edge. As the starwheel rotates, the teeth pass close to one or more fixed magnetic sensors which detect a change in a magnetic field. This change can then be used to calculate angular position.

In the preferred embodiment, the reference signal transmitted on connection 150 is a time series sinusoidal signal based on a combination of one or more harmonics of P, with P being measured for the sound producing system. When summing the various harmonics, weighting factors may be included to give a different weight to the various harmonics in the resulting output wave. In the preferred embodiment, the reference signal is a time-sampled combination of the 2P and 3P harmonics (for the helicopter reference) as represented by the following equation:

$$\text{referenceSig Sin e} = (\text{TWOPWEIGHT} * \sin(2 * \text{rotorposition}(n)) + (\text{THREEPWEIGHT} * \sin(3 * \text{rotorposition}(n))$$

In the preferred embodiment, the TWOPWEIGHT factor is 0.8 and the THREEPWEIGHT factor is 0.2. The reference signal generator (RSG) unit 106 in FIG. 10 illustrates the reference waveform that would be created by summing a 2P and 3P harmonic wave. Reference signals for other embodiments would be generated in a similar fashion.

The Controller

Referring now to FIG. 11, there is shown a block diagram of the controller 104 processor during the control mode (after the plant model training of the emulator 102 has occurred) in the preferred three-layer embodiment. In reference to FIG. 5, the inputs to the controller comprise the input signal y(n), received on connection 202 and h2(n) received on connection 199, respectively, as signals v1(n) and hv2(n), which are then filtered through a time-based delay line filter and 109 to result in the input vector v(n) (=[v1(n),v1(n−1), . . . v1(n−Nr1+1), hv2(n),hv2(n−1), . . . hv2(n−Nr2+1), b1]$^T$) (b1 is the input bias as described in FIG. 5 and the associated description of FIG. 5). For the controller, the v1(n) values received on connection 202 are the reference signals generated by the reference signal generator 106 described in connection with FIG. 10 which, in the preferred embodiment of the present invention, comprises a combination of sinusoids of a base reference rate delivered on connection 150.

In the preferred embodiment, the hv2(n) signal received on connection 199 is the forward velocity of the vehicle indicative of the operating condition and delivered on connection 119. However, in one alternate embodiment of the present invention, the hv2(n) vector may be null. Whether the hv2(n) vector is null or populated depends on which indicative parameters are selected for the particular embodiment of the AAVNAS.

Connections 150 and 119 describing the input to the controller 104 are the same connections with connection 202 and 199 describing the input to the generic neural network. In the preferred embodiment, the input vector v(n) contains all of the delayed values stored in the time-based filter 109. However, an alternate embodiment would be to compose the input vector from selected values stored in the time-based filter and 109.

The controller 104 does a forward pass of the time-based filter reference vector v(n) through its neural net matrix coefficients to generate the output control signal u(n) on connection 122 which is composed of a combination of phase and amplitude shifted harmonics of the base reference rate P. Even though the reference signal contains possibly 2P and 3P frequencies, the nonlinear sigmoidal functions in the neural net controller can model higher order harmonics that may be present in the error signals. In the preferred embodiment, the neural net generates a control signal that contains a combination of the 2P, 3P, 4P, and 5P harmonics for the reduction of vibration and noise in reference to the helicopter application determined from digital closed loop simulations of the neural network and math models of the blade-flap BVI noise dynamics.

The preferred embodiment of the controller has three layers with the third layer comprising a single element (neuron) because the controller only transmits a single control signal on connection 122 to be used by the altering-device 124 (see Use of the Control Signal section, below) and also to be used as an input into the time-based filter 108 of the emulator 102. While data are progressing in a forward direction through the several layers of the controller 104 (forward pass of the reference signal), the intermediate results from the input, first and second layer are stored in memory locations to be used during the backpropagation of the gradients calculated by the emulator 102 that occurs during the reverse pass.

In FIG. 11, the input reference column vector and delayed copies {v(n),v(n−1), . . . v(n−j), . . . } are stored in memory location 315, the first layer output column vector and delayed copies {x1c(n),x1c(n−1), . . . x1c(n−j), . . . } are stored in memory location 320 and the second column vector and delayed copies {x2c(n),x2c(n−1), . . . x2c(n−j), . . . } are stored in memory location 322 respectively (Note: j=0,1, . . . Nu1−1, and Nu1 is equal to the number of taps in the emulator input delay line 108 filtering the control signal u(n)). The output signal on connection 122 represents the results stored in location 324 and drives an altering-device 124 (see also FIG. 4 and the associated description) to minimize the fluid flow disruptions which result in the sensed noise and vibration.

Additionally, the output control signal on connection 122 is an input to the time-based filter 108 of the emulator 102, which is used in the emulator's plant model for estimating noise and vibration and for computing the gradient of the objective function with respect to the plant input. After calculating and sending the output control signal on connection 122, the controller 104 waits for the emulator 102 to return the instantaneous gradient of the objective function on connection 140.

During the reverse pass, the preprocessed sensed noise and vibration signals from unit 110 (SNVPU) are received by the emulator on connection 136 (FIG. 9) and are then backpropagated through the emulator 102 to generate the instantaneous gradient of the objective function with respect to the j'th control input signal u(n−j) (equation (4)). This gradient is received by the controller and is then backpropagated through the controller network using a temporal backpropagation algorithm for FIR neural networks ("Temporal Backpropagation for FIR Neural Networks", Wan E. A., 1190, IEEE International Joint Conference on Neural Networks, San Diego Calif.) since the controller and emulator are separated by the tapped delay line.

Using equation (4), the coefficients of the third layer in the controller is now adapted using a gradient descent algorithm:

$$w^{(3c)}(n+1) = w^{(3c)}(n) - \mu \sum_{j=0}^{Nu1-1} \frac{\partial J}{\partial u(n-j)} \frac{\partial u(n-j)}{\partial y^{(3c)}(n-j)} \frac{\partial y^{(3c)}(n-j)}{\partial w^{(3c)}} \quad (9)$$

$$= w^{(3c)}(n) - \mu \sum_{j=0}^{Nu1-1} \delta^{(3c)}(n-j) \cdot x2c^T(n-j)$$

Referring to FIG. 11 and equation (9), $W^{(3c)}$ is the row vector in the third layer of the neural net controller, j is the time delay index (j=0,1, ... Nu1-1), in the input delay line of the emulator which filters the input control signal u(n), $\mu$ is the convergence parameter of the gradient algorithm and can be made adaptive as specified in the Haykin reference via the delta-bar-delta learning rule, and $$\frac{\partial J}{\partial y^{(3c)}(n-j)} \equiv \delta^{(3c)}(n-j) = \sigma'(y^{(3c)}(n-j)) \cdot \frac{\partial J}{\partial u(n-j)} \quad (10)$$

was previously determined from the emulator backpropagation. The $\delta^{(3c)}(n-j)$ gradient is now backpropagated through the neural net controller to determine the corresponding gradients in the second layer $\delta_p^{(2c)}(n-j)$ and first layer $\delta_\kappa^{(1c)}(n-j)$, (p=0,1, ... P, k=0,1, ... K, j=0,1, ... Nu1-1) and provide the adaptation of the controller matrix coefficients. The p'th and k'th row vectors in the second and third controller layer respectively are then updated using the following update rules:

$$w_p^{(2c)}(n+1) = w_p^{(2c)}(n) - \mu \sum_{j=0}^{Nu1-1} \delta_p^{(2c)}(n-j) \cdot x1c^T(n-j) \quad (11)$$

$$w_k^{(1c)}(n+1) = w_k^{(1c)}(n) - \mu \sum_{j=0}^{Nu1-1} \delta_k^{(1c)}(n-j) \cdot v^T(n-j) \quad (12)$$

p=0,1, ... P (nodes in second layer)
k=0,1, ... K (nodes in first layer)
The input and first layer column vectors and delayed copies, i.e., {v(n),v(n-1), ... v(n-j), ..., x1c(n), x1c(n-1), ... x1c(n-j), ... } previously stored in memory locations 315/320, and {x2c(n),x2c(n-1), ..., x2c(n-j), ...} from the second layer stored in memory location 322, are now used in the update rules of equations 9-2. In addition, the gradients at the current cycle and at Nu-1 previous cycles of the first, second and third layer {$\delta^{(3c)}(n-j)$, $\delta_p^{(2c)}(n-j)$, $\delta_k^{(1c)}(n-j)$, where p=0,1, ... P' and k=0,1, ... K, j=0,1, ... Nu1-1} are also maintained in memory since these components are required in the neural net matrix coefficients update rules. The controller matrix coefficients are then modified in real time according to equations 9-12.

After the controller matrix coefficients have been updated, the controller does a forward pass of the time-based filter reference vector v(n) through its updated neural net matrix coefficients and calculates a new output control signal on connection 122. The control signal drives the altering device 124 to reduce the noise and vibration and also drives the emulator 102 to compute a new plant gradient for the next state. A complete elimination of the noise and vibration is not always achievable. The controller adapts its matrix coefficients during each state to determine the optimum control solution that will drive the plant to generate the minimal noise possible under the current operating conditions.

The initial weights of the controller can be set to optimum values which can be either pre-computed from an off-line digital simulator, or computed and stored in computer memory-based on a previous operation of the vehicle. In the off-line pre-computed scheme, the digital simulator consists of the neural net controller configured to reduce the output of the neural net emulator which models the plant noise and vibration output signals. In the simulation, the neural net controller adapts its coefficients to reduce the emulator equivalent plant noise and vibration outputs. The converged set of controller matrix coefficients from the simulation can then be used to initialize the real time controller. In the absence of an off-line simulator, and for a first-time operation, the real time controller matrix coefficients are set to small random values, and the controller training at the operational points in the specified operation regime takes place in real time. Empirically, the initial values have been determined to affect the controller's performance relative to the function of produced noise and vibration. Initial non-random values can result in the controller getting stuck at local minima in the produced noise function, thus halting the move toward the global solution. Random initial values are more likely to avoid the pitfall of local minima in the vibration and noise function.

In the preferred, helicopter embodiment, once the first helicopter flight is complete, the controller has been trained and tested at various operational points for the specified flight regime. A control solution for each operational point in the flight regime is now stored in the computer memory and can be accessed to initialize the controller for the next flight operation using the forward velocity as the indicator in selecting the appropriate flap control solution. Therefore, during the next flight operation, the controller will initialize itself in real time with the closest optimum solution computed in the previous flight, using the current flight condition input signal. This approach is realizable since neural nets have an inherent capability of interpolation; and even though the operational point may be slightly different from the previous flight, the neural net controller will interpolate to provide the best starting point solution. Since this starting solution is close to the optimum, the controller will quickly converge to the optimum solution.

The number of neurons in each layer is dependent on external factors. For the controller, the last (third in the preferred embodiment of the present invention) layer comprises a single neuron because only one control output is produced by the controller. The number of neurons in the first, second and any subsequent intermediate layers represents a tradeoff between two competing factors. The first factor is computational resources, i.e. the amount of computer time available to execute the algorithm. Each neuron added increases the amount of calculation necessary to generate a control signal. The second factor is controller performance in noise and vibration reduction. More neurons increases the ability of the controller to generate control signals giving better noise and vibration reduction. After a certain number of neurons (which depends on the complexity of the plant being modeled), additional neurons result in only marginal performance improvements. Available computational resources are balanced against the marginal performance improvements when determining whether to add another neuron to the neural net first and second layers.

Use of the Control Signal

Referring now to FIG. 12, there is shown a system for using one control signal to control multiple altering-devices. In applications such as the helicopter rotor and ship propellers discussed above, multiple surfaces exist over which the fluid is flowing and producing noise and vibration. In some of these applications, the surfaces (rotor blades or propeller blades) are all following the same path and encountering the same conditions. A separate controller for each blade would be unnecessarily redundant. Instead, a control signal on connection 122 is calculated for one of the blades and then delayed for appropriate time periods before being sent to each of the other blades, in turn.

For example, on a rotor or propeller with four blades connected to a hub 350, there is only one control signal generated by the controller. This control signal on connection 122 (FIG. 12) drives the altering-device on the first blade to control the linkage mechanism to the flap or pitch control 352. The signals which control the other (second, third and fourth) altering-devices 354 356 358 are generated by delaying the first altering device's control signal by the time that it takes for the subsequent blades to reach the same angular position in which the first blade is currently located. On a four-blade propeller, this delay period would be T/4 where T represents the period of the blade rotation (i.e. the amount of time necessary for a full rotation of the rotor).

The delayed signals are delivered to the altering-devices on connections 360, 362, and 364 respectively after the appropriate time delay, (i.e., at time T/4, the signal generated by the controller is delivered on connection 360 to second altering-device 354, at time T/2, the signal generated by the controller is delivered on connection 362 to third altering-device 356 and at time 3/4T, the signal generated by the controller is delivered on connection 364 to fourth altering-device 358). The blades are connected to a mount 370 which is connected to the helicopter body 380. Note that all blades fly the same around the path, and therefore all the altering-devices (i.e. flaps or propeller blades) should also follow the same prescribed trajectory at each point in the rotation of the rotor.

In the preferred embodiment, the use of blade flap slaving was based on the blade tracking requirement imposed on the control system. Blade tracking implies that all blades must fly the same around the azimuth. To achieve the blade tracking, the algorithm was constrained by slaving the blade-flaps to a master blade-flap. It should be noted that slaving is not an invention but rather a requirement on the control system, and also is not required to insure minimum vibration. An alternate procedure is to have a control system whose dimension is the rank of control space for one blade multiplied by the number of blades, i.e. each flap's motion can differ in ways other than a simple time delay. Vibration and Noise reduction and other constraints such as helicopter blade tracking can then be imposed through the objective function of the control system. This increases the number of degrees that are controlled. It is a general principle that if the number of controllable degrees of freedom available to the controller are increased, then the optimum achieved is a better optimum.

While the form of the apparatus and method steps herein described constitute a preferred embodiment of the present invention, it is to be understood that the invention is not limited to this precise form of either the apparatus or method disclosed herein and that changes may be made therein without departing from the scope of the invention which is defined in the appended claims. Specifically, while the preferred embodiment of the present invention discloses the use of the controller in a nonlinear system, the controller will work effectively in an application in which linear noise and vibration were generated by the associated plant.

We claim:
1. A process of adaptively controlling noise and vibration in a plant comprising:
 (a) creating a plant model by modeling noise and vibration characteristics of the plant;
 (b) adjusting a current state of a means for altering the noise and vibration characteristics of the plant;
 (c) ascertaining a noise and vibration independent parameter indicative of the noise and vibration of the plant;
 (d) creating a reference signal;
 (e) minimizing an objective function related to the measured noise and vibration envelope;
 (f) creating a plant gradient from the plant model and the objective function to control the state of the means for altering the noise and vibration characteristics of the plant;
 (g) calculating an estimated noise and vibration envelope based on the noise and vibration independent parameter indicative of the noise and vibration of the plant in conjunction with the state of the altering means;
 (h) sensing noise and vibration signals;
 (i) extracting a targeted frequency bandwidth envelope of noise and vibration signals desired to be controlled;
 (j) comparing the estimated noise and vibration envelope with the preprocessed noise and vibration envelope;
 (k) determining errors in the plant model based on the difference in the estimated and preprocessed noise and vibration envelopes; and
 (l) adapting the adjustment parameters to reduce the objective function.

2. A process of adaptively controlling noise and vibration in a plant comprising:
 (a) using an emulator neural network to model noise and vibration characteristics of the plant;
 (b) generating a reference signal;
 (c) storing, as data, the reference signal in controller neural network input time filters;
 (d) ascertaining a noise and vibration independent parameter indicative of the noise and vibration of the plant;
 (e) storing, as data, the parameter related to the noise and vibration of the plant in controller neural network input time filters;
 (f) in the controller neural network, performing a forward pass of the controller neural network input time filter data to calculate a control signal;
 on the next clock cycle,
 (g) feeding the control signal to an altering means so that the plant noise and vibration characteristics can be adjusted;
 (h) storing, as data, the control signal in emulator neural network input time filters;
 (i) re-ascertaining the noise and vibration independent parameter indicative of the noise and vibration of the plant based on the adjusted plant noise and vibration characteristics;
 (j) storing, as data, the noise and vibration independent parameter indicative of the noise and vibration of the plant in the emulator neural network input time filters;
 (k) generating a new reference signal;
 (l) storing, as data, the new reference signal and the most recent noise and vibration independent parameter indicative of the noise and vibration of the plant in the controller neural network input time filters;

(m) in the emulator neural network, performing a forward pass of the emulator neural network input time filter data to create estimate of an noise and vibration signal;

(n) obtaining a sensed noise and vibration signal from plant noise and vibration sensors;

(o) in the emulator neural network, back-propagating the sensed noise and vibration signal to obtain a plant error gradient with respect to the control signal;

(p) in the controller neural network, back-propagating the plant error gradient;

(q) adapting the controller neural network matrix coefficients based on the back-propagation of the plant error gradient;

(r) in the controller neural network, performing a forward pass of the new reference signal and the most recent noise and vibration independent parameter indicative of the noise and vibration of the plant to calculate a new control signal; and (s) repeating steps (g) through (r) for each new clock cycle.

3. The process of claim 2 further comprising:

calculating a difference between the sensed and the estimated noise and vibration signals; and comparing the difference to a threshold to determine if re-training of the emulator neural network is required.

4. The process of claim 3 wherein the step of comparing the difference calculated in step (r) to determine if re-training of the emulator neural network is required is performed in real time.

5. A process of adaptively controlling noise and vibration in a plant comprising:

generating reference signals;

ascertaining noise and vibration independent parameters indicative of the noise and vibration of the plant;

ascertaining sensed noise and vibration signal from plant noise and vibration sensors;

using the emulator neural network to:
 (a) model plant characteristics pertaining to noise and vibration;
 (b) forward pass a control signal and the noise and vibration independent parameters indicative of the noise and vibration of the plant data to create a noise and vibration estimate signal;
 (c) back-propagate the sensed noise and vibration signal to obtain a plant error gradient;

using the controller neural network to:
 (a) forward pass the reference signals and the noise and vibration independent parameters indicative of the noise and vibration of the plant to calculate a control signal;
 (b) back-propagate the plant error gradient;

adapting the emulator neural network matrix coefficients based on the back propagation of the plant error gradient by the controller neural network; and using the control signal to adjust the noise and vibration characteristics of the plant.

6. The process of claim 5 further comprising:

calculating a difference between the sensed and the estimated noise and vibration signals; and comparing the difference to a threshold to determine if re-training of the emulator neural network is required.

7. The process of claim 6 wherein said comparing the difference to a threshold to determine if re-training of the emulator neural network is required is performed in real-time.

\* \* \* \* \*